United States Patent
Connell et al.

(10) Patent No.: US 9,682,301 B2
(45) Date of Patent: Jun. 20, 2017

(54) MOBILE DEVICE WHICH SIMULATES PLAYER MOTION

(71) Applicant: Mobile Virtual Player LLC, Lebanon, NH (US)

(72) Inventors: Quinn Reid Connell, Pleasant Hill, OR (US); Elliot James Kastner, Hanover, NH (US); Noah James Glennon, Portsmouth, NH (US); Andrew Smist, Cambridge, MA (US); Eugene F. Teevens, Hanover, NH (US); John H. Currier, Norwich, VT (US)

(73) Assignee: Mobile Virtual Player LLC, Lebanon, NH (US)

( * ) Notice: Subject to any disclaimer, the term of this patent is extended or adjusted under 35 U.S.C. 154(b) by 0 days.

(21) Appl. No.: 15/240,346

(22) Filed: Aug. 18, 2016

(65) Prior Publication Data
US 2016/0375337 A1 Dec. 29, 2016

Related U.S. Application Data

(63) Continuation-in-part of application No. 14/582,264, filed on Dec. 24, 2014, now Pat. No. 9,427,649.

(60) Provisional application No. 62/274,834, filed on Jan. 5, 2016.

(51) Int. Cl.
| | |
|---|---|
| *A63B 69/34* | (2006.01) |
| *H04M 1/725* | (2006.01) |
| *H04W 4/02* | (2009.01) |
| *A63B 71/00* | (2006.01) |

(52) U.S. Cl.
CPC ....... *A63B 69/345* (2013.01); *H04M 1/72533* (2013.01); *H04W 4/025* (2013.01); *A63B 2071/009* (2013.01); *A63B 2071/0063* (2013.01); *A63B 2225/305* (2013.01); *A63B 2243/007* (2013.01); *A63B 2243/0066* (2013.01)

(58) Field of Classification Search
CPC ....... B62K 11/007; A63B 69/34; A63B 69/24; A63B 69/345
USPC ........... 473/441, 445, 444, 438; 180/7.1, 21, 180/218, 167, 168
See application file for complete search history.

(56) References Cited

U.S. PATENT DOCUMENTS

| | | |
|---|---|---|
| 314,549 A | 3/1885 | Tucker |
| 1,204,017 A | 11/1916 | Hinkey |
| 1,544,110 A | 6/1925 | Stall |

(Continued)

*Primary Examiner* — Aarti B Berdichevsky
*Assistant Examiner* — Rayshun Peng
(74) *Attorney, Agent, or Firm* — Blank Rome LLP

(57) ABSTRACT

A mobile device and system which simulates human motion. The device includes a base with a drive system for providing motion to the device. A receiver is provided which controls the drive system the receiver receives wireless control signals. Pads and a self-stabilizing component are provided on the device. The device accurately mimics the unpredictable motion of a human motion to provide a safer alternative to live interaction to increase participant safety and decrease the incidence of injuries during practice or drill sessions. The system includes at least one mobile device. The mobile device includes: a base having a drive system for providing motion to the device; a receiver which controls the drive system the receiver receives wireless control signals; and self-stabilizing component provided on the device. The system also includes a transmitter for transmitting the control signals to the receiver.

29 Claims, 17 Drawing Sheets

(56) References Cited

U.S. PATENT DOCUMENTS

| | | |
|---|---|---|
| 1,611,194 A | 12/1926 | Henderson |
| 1,622,691 A | 3/1927 | Warner |
| 1,663,659 A | 3/1928 | Hart et al. |
| 1,708,638 A | 4/1929 | Smith |
| 1,817,364 A | 8/1931 | Goldsmith |
| 1,906,693 A | 5/1933 | Loughlin |
| 2,037,508 A * | 4/1936 | Gilman ............... A63B 69/345 473/444 |
| 2,466,954 A | 4/1949 | King |
| 2,937,872 A * | 5/1960 | Gilman ............... A63B 69/345 446/396 |
| 3,114,549 A | 12/1963 | Hooker |
| 3,281,148 A | 10/1966 | Cummins |
| 3,337,217 A | 8/1967 | Cummins |
| 3,464,696 A | 9/1969 | Hooker |
| 3,556,523 A | 1/1971 | Hooker |
| 3,637,210 A | 1/1972 | Brantley |
| 3,659,848 A | 5/1972 | DePew |
| 4,861,053 A | 8/1989 | Yeomans, Jr. |
| 5,110,124 A | 5/1992 | Micco |
| 5,280,905 A | 1/1994 | Micco |
| 5,335,906 A | 8/1994 | Delker |
| 7,794,337 B2 | 9/2010 | Gamboa |
| 8,028,775 B2 | 10/2011 | Orenbuch |
| 8,070,561 B2 | 12/2011 | Liffers |
| 8,459,383 B1 | 6/2013 | Burget |
| 8,499,864 B2 | 8/2013 | Takenaka |
| 8,790,198 B1 | 7/2014 | Russell |
| 8,808,115 B2 | 8/2014 | De Troia |
| 2008/0179115 A1* | 7/2008 | Ohm ..................... B25J 5/005 180/9.21 |
| 2008/0269016 A1* | 10/2008 | Ungari ............... A63B 69/0053 482/1 |
| 2010/0127890 A1* | 5/2010 | Spinelli ................ B62D 57/00 340/870.02 |
| 2010/0198528 A1* | 8/2010 | McCauley ......... A63B 24/0021 702/41 |
| 2010/0243342 A1 | 9/2010 | Wu |
| 2012/0175175 A1* | 7/2012 | Gomi ..................... B62J 1/005 180/21 |
| 2012/0283047 A1 | 11/2012 | De Troia |
| 2013/0053189 A1* | 2/2013 | Peterson ............. A63B 69/345 473/445 |
| 2014/0067178 A1* | 3/2014 | Taira ..................... B62K 3/007 701/22 |
| 2014/0330452 A1* | 11/2014 | Stewart ............... B25J 11/0085 701/2 |

* cited by examiner

MOBILE DEVICE WHICH SIMULATES PLAYER MOTION

CROSS-REFERENCE TO RELATED APPLICATIONS

This application claims priority to and the benefit of U.S. patent application Ser. No. 14/582,264 filed Dec. 24, 2014, which claims priority from U.S. Provisional Application No. 61/920,801 filed Dec. 26, 2013. The application also claims priority to and the benefit of U.S. Provisional Application No. 62/274,834 filed Jan. 5, 2016. All of the referenced application are incorporated by reference in its entirety herein.

FIELD OF THE INVENTION

The present invention is directed to a dynamic drive system and mobile device which can be integrated into any activity where simulated or actual motion from a non-human device can improve safety, practice efficiency and performance, including, but not limited to, athletics and military/law enforcement. In particular, the invention is directed to any powered mobile device which suits to replace a human counterpart for improved safety and more effective training.

BACKGROUND OF THE INVENTION

Many activities pose serious health risks to the participants. These health risks are also present when practicing or drilling for these activities. For example, a major concern facing football players today is the risk of concussive head injuries, which can lead to a variety of dangerous medical conditions. In order to reduce the occurrence of these types of injuries, teams/organizations are limiting contact during practices. In place of tackling each other during practice, most teams now use tackling drills which simplify tackling and break it into multiple steps which can be safely practiced. Limiting contact has been successful at reducing injuries during practice or drilling, but it has left no way for players or participants to practice realistic or relevant scenarios.

As an example of such limited contact, in football, current drills focus on pursuing a player and not finishing the tackle to the ground, or using a padded target, known as a tackling dummy, instead of a live player. Tackling dummies are used by almost all football teams but do not simulate a realistic tackle because they are static objects whereas an opposing player moves dynamically. There are some products on the market today that attempt to mobilize the tackling dummy; however, none of them accurately simulate the motion of a live player.

Although various methods to provide for increased safety in football and other activities have been attempted, known devices have not effectively protected athletes or participants while simulating the motion of a live person. In order to prevent injuries while allowing players or participants to practice various movements without person-to-person contact or interaction, individuals, organization and sports teams are in need of a dynamic and mobile device which replicates or simulates human motion as realistically as possible.

It would, therefore, be beneficial to provide a device or system which safely allows players or participants to practice proper form and procedure in realistic and relevant scenarios. It would also be beneficial to provide a device or system which is a safer alternative to live play or motion and which increases participant safety and reduces the incidence of injuries while at the same time reinforcing proper form and procedure. It would also be beneficial to provide a device or system which increases training efficacy by allowing trainers more complete control over the motion of elements in the training environment.

SUMMARY OF THE INVENTION

An object is to provide a device and/or drive system which safely allows participants to practice or train in a realistic and relevant scenario.

An object is to provide a device and/or drive system which provides a safer alternative to human interaction and which increases participant safety when compared to person to person contact and reduces the incidence of injuries while at the same time reinforcing proper form and procedure.

An object is to provide a device and/or drive system which reflects the unpredictable motion of a live player or participant.

An object is to provide a device and/or drive system which simulates realistic human movement.

An object is to provide a dynamic drive system and mobile device which can be integrated into any activity where simulated or actual motion from a non-human device can improve safety, practice efficiency and performance, including, but not limited to, athletics and military/law enforcement. Actualizations include, but are not limited to: rugby, lacrosse, soccer, hockey, field hockey, hurling, volleyball, basketball, tennis and racquet sports, wrestling, baseball, cricket, archery, hunting, boxing, kickboxing, taekwondo, mixed martial arts, flying disc sports, striking or grappling sports, football sports (American football, Gaelic football, Australian football, etc.), military, combat, animal training and police/crowd control.

An object is to provide a device and/or drive system which satisfactorily performs its intended function on various surfaces and in all types of weather conditions.

An object is to provide a device and/or drive system which can be easily stored, and which may include sufficient weather proofing to account for accidentally leaving the device in the elements for a period of time.

An object is to provide a device and/or drive system which, after a completed drill, must regain balance/control, deemed by percent of driveability/usability restored, and return to a satisfactory starting position to repeat again.

An object is to provide a device and/or drive system which is controlled using a wired or wireless control system, allowing for device to be controlled remotely to facilitate maximum mobility and precision.

An embodiment is directed to a mobile device which simulates player motion, the device including a drive for providing motion to the device and pads positioned on the device. The device accurately mimics the unpredictable motion, with sufficient degrees of freedom, of a human to provide a safe alternative to live interaction to increase participant safety and decrease the incidence of injuries during practice or training.

An embodiment is directed to a controlled mobile device which simulates player motion. The device includes: a drive for providing translational or rolling motion to the device; at least one motor providing the motive force to power the drive; a wireless controller which controls the at least one motor; and infrastructure, such as, but not limited to, pads, suitably attached and positioned on the device. The device accurately mimics the unpredictable motion of a human to provide a safer alternative to live interaction to increase participant safety and decrease the incidence of injuries during practice or training.

An embodiment is directed to a mobile device which simulates human motion. The device includes a base with a drive system for providing motion to the device. Pads and a self-stabilizing component are provided on the device. The device accurately mimics the unpredictable motion of a human motion to provide a safer alternative to live interaction to increase participant safety and benefit while decreasing the incidence of injuries during practice or drill sessions.

An embodiment is directed to a mobile device which simulates human motion. The device includes a base with a drive system for providing motion to the device. A receiver is provided which controls the drive system, the receiver receives wireless control signals. A self-righting component is provided on the device. The device accurately mimics the unpredictable and evasive motion often used by humans to provide a safer alternative to live interaction to increase participant safety and decrease the incidence of injuries during practice or drill sessions.

An embodiment is directed to a system for controlling a mobile device which simulates human motion. The system includes at least one mobile device. The mobile device includes: a base having a drive system for providing motion to the device; a receiver which controls the drive system; a receiver receives wireless control signals; and self-stabilizing component provided on the device. The system also includes a transmitter for transmitting the control signals to the receiver.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
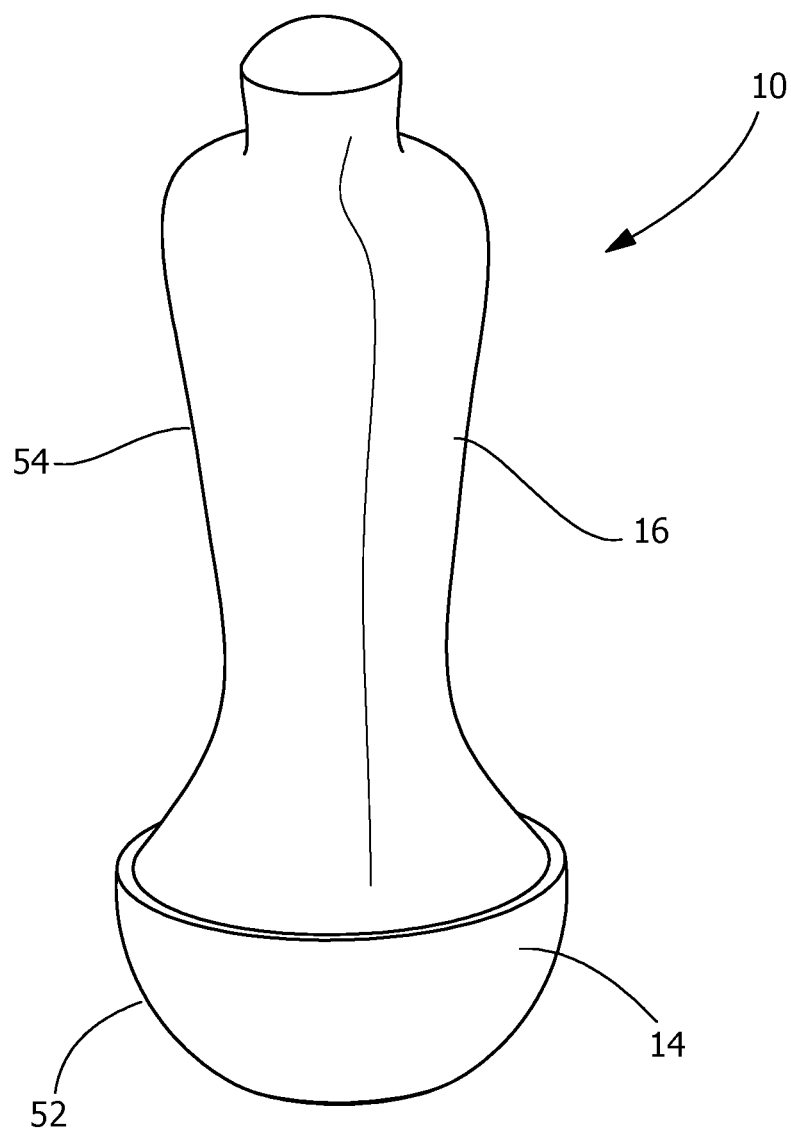
FIG. 1 is a perspective view of an illustrative embodiment of a mobile device which simulates player motion according to the present invention.
Figure 2:
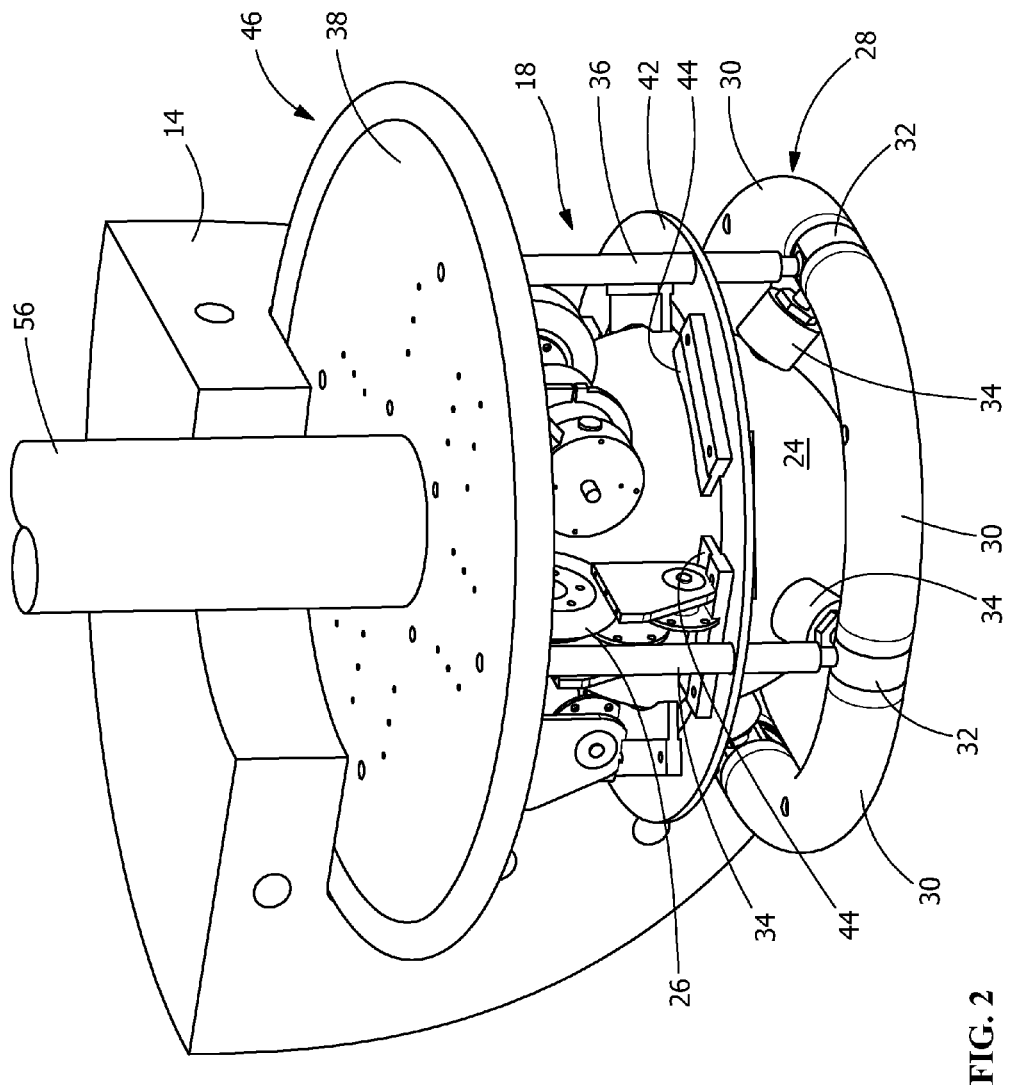
FIG. 2 is a top, side perspective view of a lower portion of the mobile device of FIG. 1 with portions of the padding removed.
Figure 3:
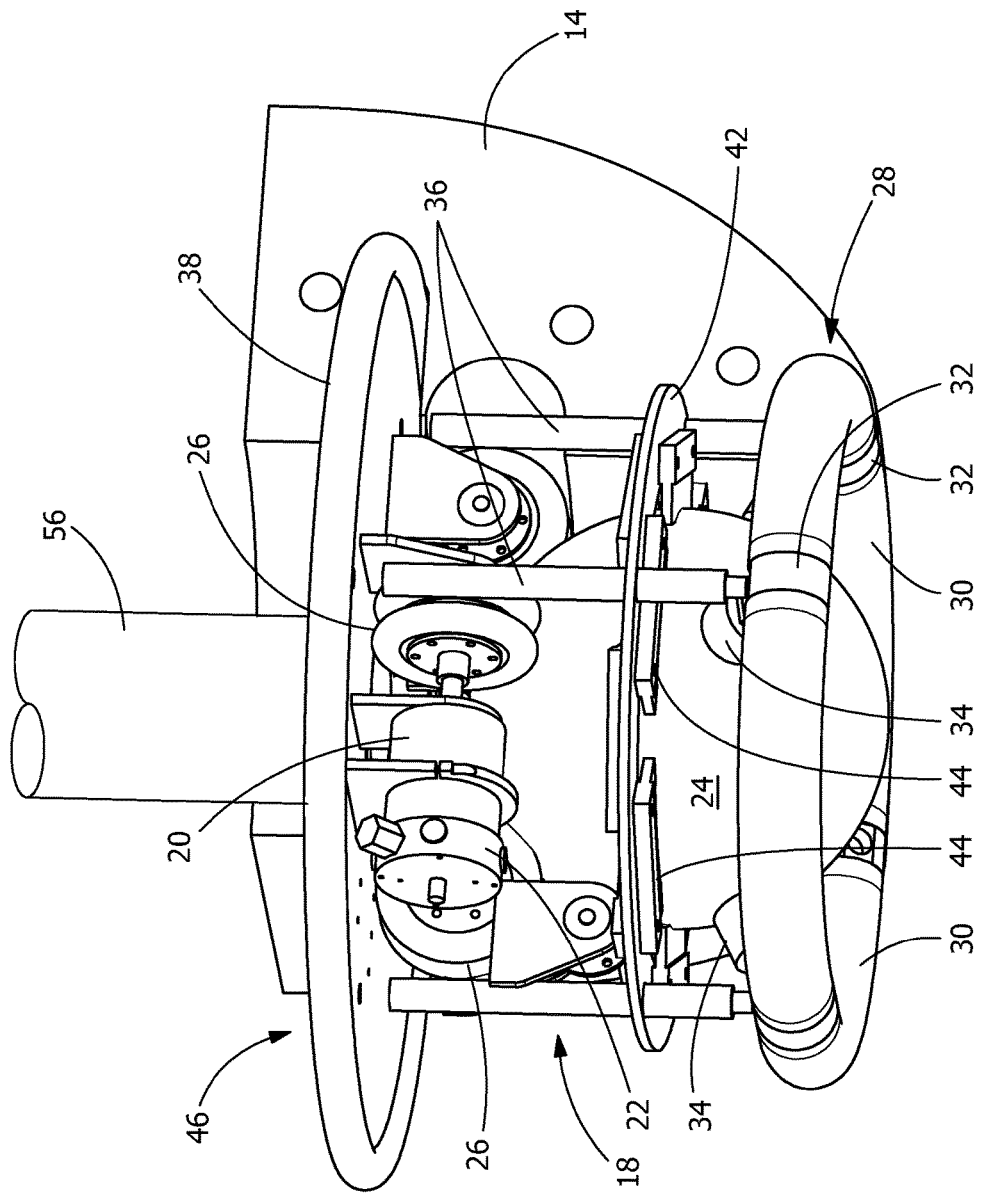
FIG. 3 is a bottom, side perspective view of the lower portion of the mobile device shown in FIG. 2.
Figure 4:
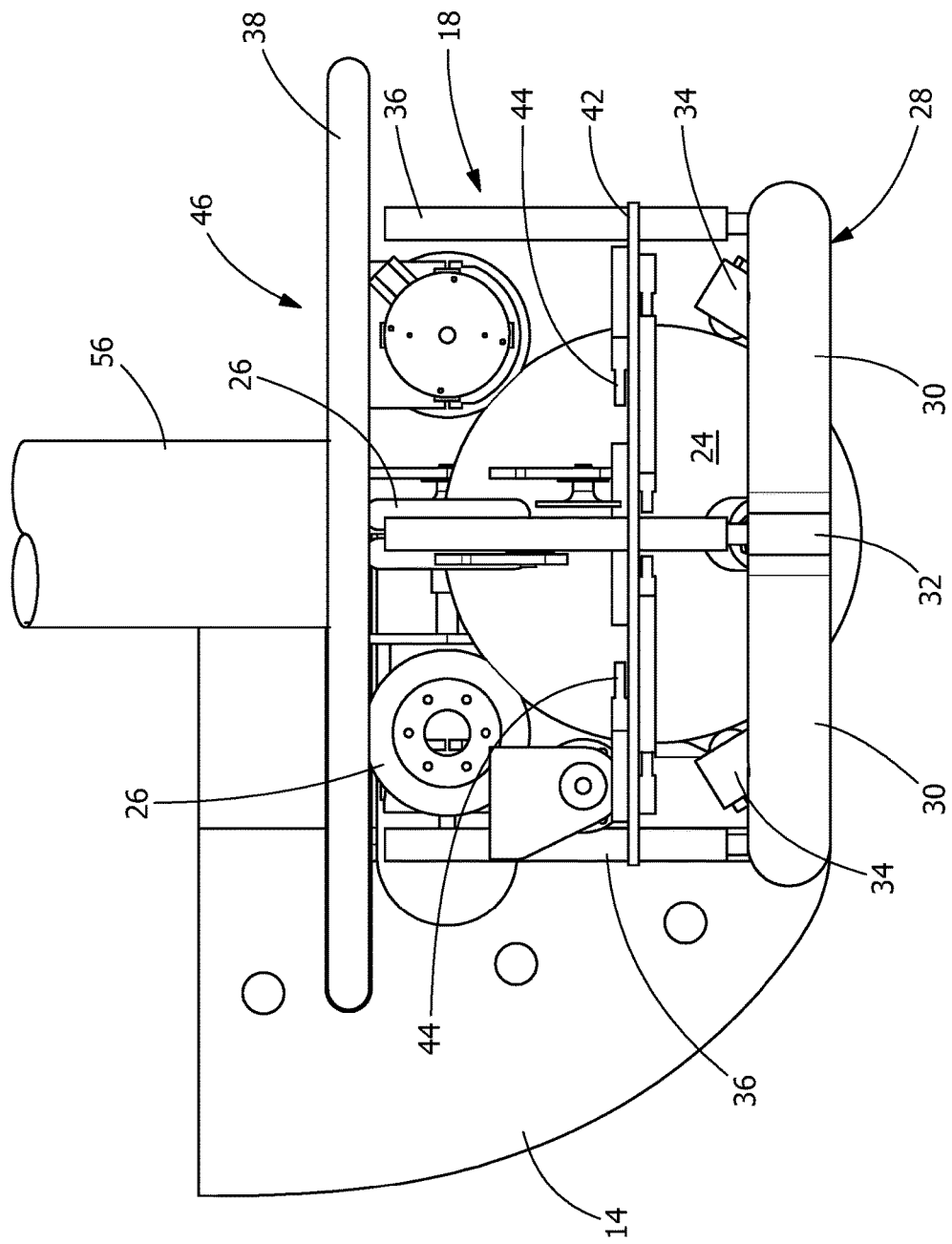
FIG. 4 is side view of the lower portion of the mobile device shown in FIG. 2.
Figure 5:
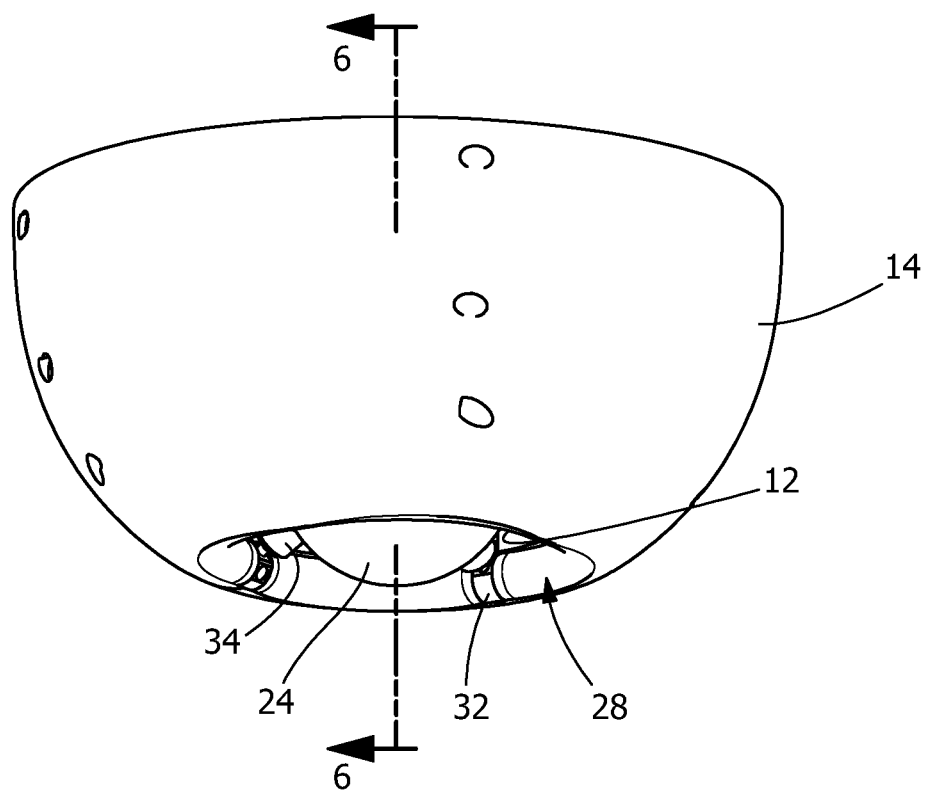
FIG. 5 is a bottom, side perspective view of a lower portion of the mobile device of FIG. 1.
Figure 6:
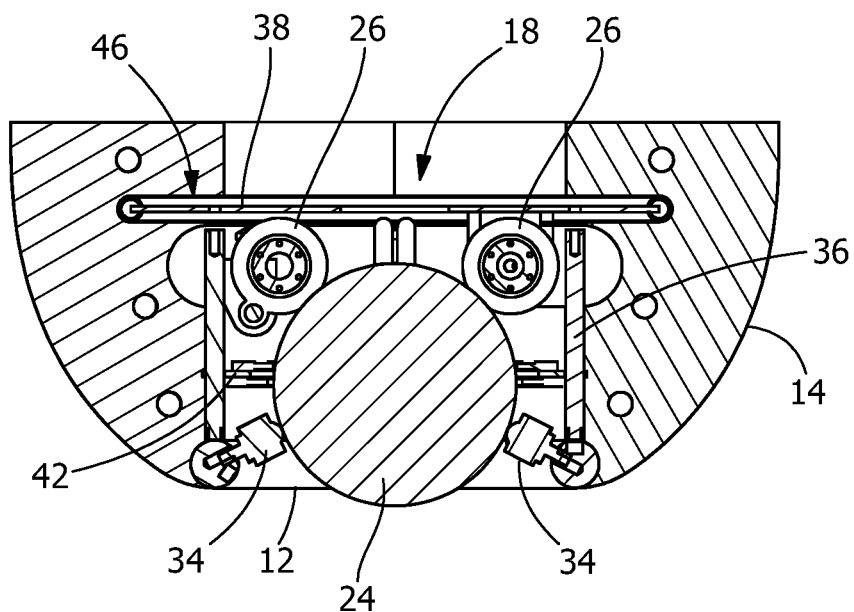
FIG. 6 is a cross section of the lower portion of the mobile device taken along line 6-6 of FIG. 5.
Figure 7:
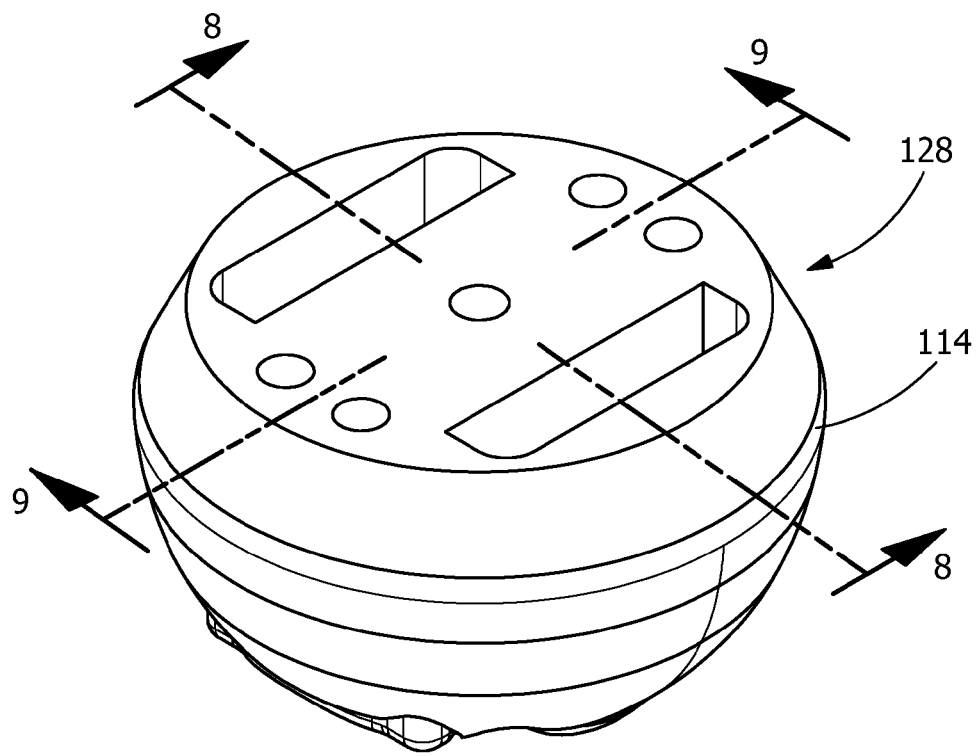
FIG. 7 is a perspective view of an alternate illustrative embodiment, a base of a mobile device which simulates human motion according to the present invention.
Figure 10:
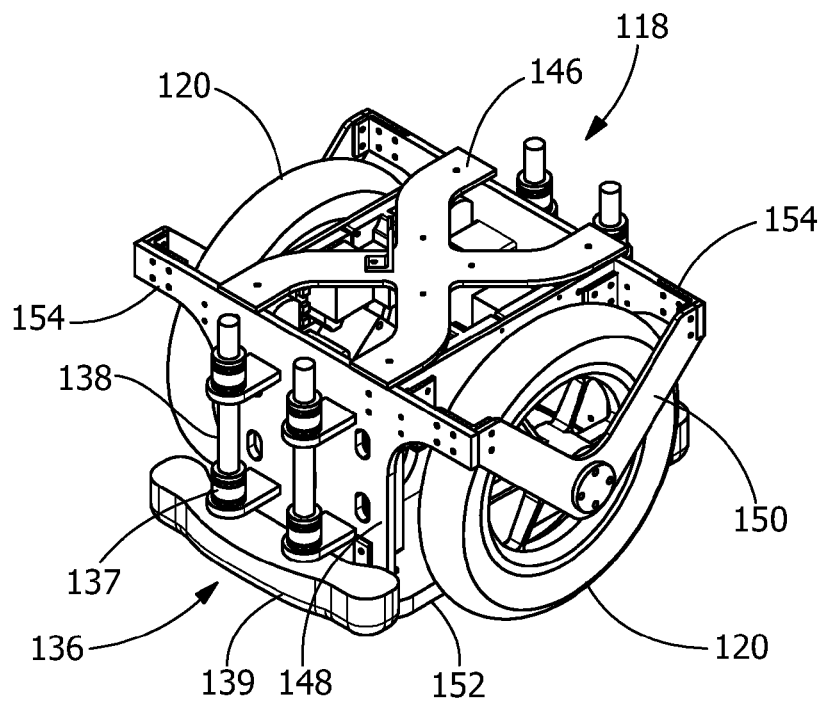
FIG. 10 is a perspective view of the base of FIG. 7 with a cover removed.
Figure 8:
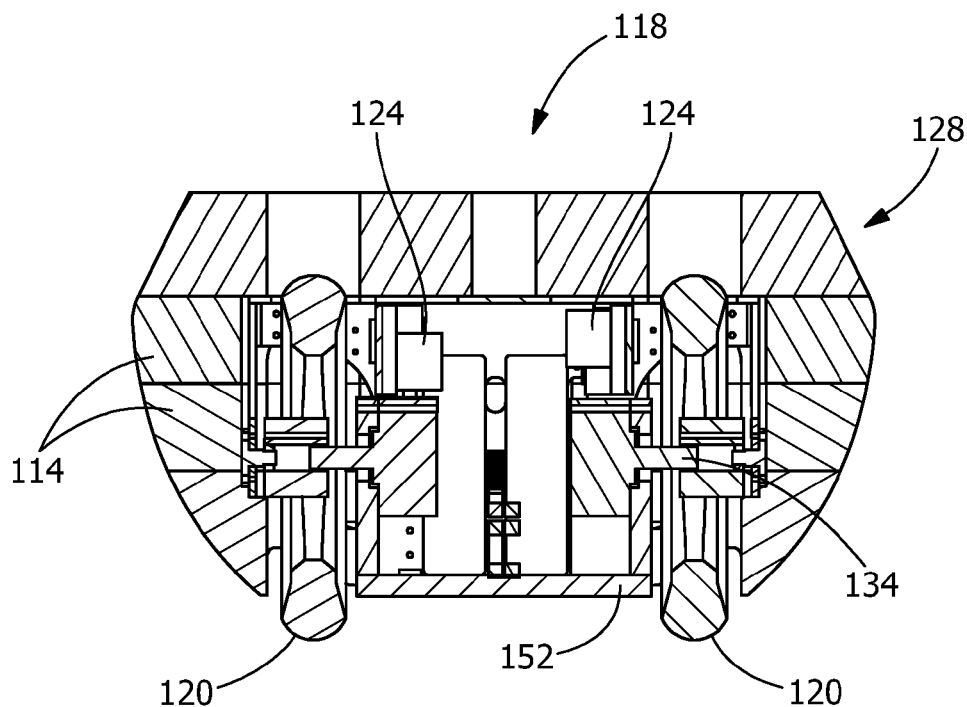
FIG. 8 is a cross section of the base of the mobile device taken along line 8-8 of FIG. 7.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the illustrative embodiments. Accordingly, the invention expressly should not be limited to such illustrative embodiments illustrating some possible non-limiting combination of features that may exist alone or in other combinations of features. In particular, while the detailed description provided herein is directed to applications related to football, the invention is not so limited. The invention can be used for any sport or activity which could benefit from a dynamic mobile device to simulate player or participant's motion.

In general, the invention is directed to a remotely controlled or semi-autonomous mobile device and to a drive system which controls the same. In various illustrative embodiments, the device has no external infrastructure in order to maximize mobility of the device and the safety of the participants. The entire device, with the exception of the bottom opening, may be covered in padding. In some forms the wheels may be the only non-padded portion of the device.

Different types of motion of the device may be used, including, but not limited to, leaning, rolling, sliding and launching. In the illustrative embodiments shown, rolling motion is used because it is the most similar to the motion of a live participant. In FIGS. 1-6, the rolling motion is accomplished by a ball drive system 18 that will be more fully described below. In FIGS. 7-16, the rolling motion is accomplished by a wheel drive system that will be more fully described below. The drive systems accurately mimics the unpredictable motion of a live participant by allowing instant acceleration in any direction. The drive also exhibits a zero turning radius and protects hard edges that could injure a player. The mass, velocity capabilities and acceleration of the illustrated powered devices are engineered to replicate that of the human counterpart being replaced.

Referring initially to the illustrative embodiment shown in FIGS. 1-6, gravity is used to reset the device 10 after the device 10 is tackled to the ground. As the device 10 is self-righting, no additional motors or other devices are required for this function. In order to accomplish this method of reset, the geometry and weight distribution of the pads 14, 16 of the device 10 allows the device 10 to be passively self-righting, allowing for the quick repetitions of drills that are required during practice.

At least one motor 20 is used as the motive force. The at least one motor is easily controllable and can provide ample force. Batteries are used as the power source because they are a portable and safe power source that will work in all weather conditions. The device 10 is controlled using a remote control system, allowing for maximum mobility and precision.

As shown in FIG. 1, the shape of the pad approximates a humanoid form figure in the illustrative embodiment. This gives players a realistic-looking target and reinforces safe tackling form by encouraging tackling at the correct height.

The device 10 is driven by a uni-ball drive system 18, although other drive systems such as, but not limited to, multi-ball drive systems and wheel based systems may be used without departing from the scope of the invention. The uni-ball drive system 18 shown includes a single large ball 24 that is driven by wheels 26. In the embodiment, the wheels 26 are omni-directional wheels. The omni-directional wheels are able to power the ball 24 in any direction, allowing for a complete range of motion and allowing for the device 10 to quickly and elegantly change directions.

In the illustrative embodiment, the wheels 26 have rubber rollers to increase the resistance to slipping between the ball 24 and the rollers 26. Other materials can be used to decrease the slippage of the ball relative to the rollers.

In one embodiment, dual omni-wheels 26 are used to transmit forces tangent to their direction of motion to the ball 24, while not inhibiting motion in all other directions. The omni-directional wheels may be of various sizes depending upon the size of the device and the type of ball drive used. For example, in the illustrative embodiment shown, the omni-wheels 26 may have a four inch diameter.

In the embodiment shown, a ten inch diameter medicine ball 24 with rubber coating is used as the drive ball. The ball is selected to optimize its weight, compressibility and friction coefficient with the turf to allow for optimal performance of the device 10. The ball 24 sits within a two inch outside diameter base-ring 28 made from four 90-degree mandrel bent steel elbows 30. Steel slugs 32 are welded between the elbows 30 with holes drilled and tapped for adjustable spring members 34 to secure the drive ball 24. Four vertical rods 36 connect the base ring 28 to a plate 38, on which the motors 20 and controls system are mounted. The spring members 34 are adjustable. In the embodiment shown, the spring members 34 are ball casters which are spring loaded to apply pressure to the ball 24. Consequently, the ball casters 34 apply pressure to the ball 24 to keep the wheels 26 in contact with the ball 24 at all times despite any eccentricity in the ball's 24 shape.

As an example, drive balls 24 are not spherical, exhibiting variance in the diameter of up to ¾ inches. In such applications, the adjustability of the ball casters 34 is beneficial. Rather than fixing the ball casters 34 against the ball 24, tension springs are included in the ball casters 34 to allow the ball casters 34 to force the ball 24 toward the wheels 26, causing the omni-wheels 26 to remain in contact with the ball 24 at all times despite eccentricity in the ball's 24 shape. Consequently, the ability of the motors 20 to drive the ball 24 in any direction is not affected by the eccentricity of the ball 24.

The ball 24 drive must have adequate traction on the field, particularly in wet conditions. Artificial turf has a higher coefficient of friction than natural grass and does not become as slippery when wet. An illustrative embodiment has a coefficient of friction with the turf of greater than 0.35, greater than 0.5 or greater than 0.7.

In one alternate embodiment, a basketball was chosen for the ball 24 drive. In other embodiments, a soccer ball, tether ball, medicine ball or water polo ball were used. Regardless of the ball 24 used, the weight of the ball 24 must be considered. A ball that is heavy relative to the overall weight of the device 10 causes ball's 24 moment of inertia relative to the device 10 to be large, thereby causing the unwanted effect of having the pads 14, 16 rotate around the ball 24, rather than the ball 24 rotating within the pads 14, 16. In such an embodiment, an inflatable ball 24 acts as a suspension system to maintain constant pressure on all contact points with the wheels 26.

In another alternate embodiment, a non-inflatable ball 24 is used. Such a ball greatly reduces the risks associated with irregularities in ball shape and allows for a more rigid and robust drive system. Such balls may include, but are not limited to, rubber-coated nylon and HDPE balls.

In the illustrative embodiment show, four omni-directional wheels 26 are provided to control the ball 24. However, other numbers, sizes, positions and types of wheels may be provided without departing from the scope of the invention. The wheels 26 are configured such that the friction of omni-wheels 26 on the ball 24 is sufficient to transmit power from the motors 20 to the drive ball 24. The four opposing omni-wheels 26 are made from aluminum with a rubber coating. In one illustrative embodiments, at least two of the omni-wheels are powered by 3 HP brushed DC motors 20 and bearings on either side to prevent side-loading on the motors 20 during the impact of a tackle. The other two omni-directional wheels are free floating. A ring 42 holding brushes 44 against the equator of the ball 24 is attached to the vertical rods 36. The brushes 44 engage the ball 24 to remove debris and loose turf blades, thereby preventing the debris and turf blades from interfering with the motors 20 and wheels 26. A rubberized coating is applied to the upper plate 38 of frame 46 to eliminate all edges which may pose injury risks.

As mentioned previously, a 3 hp motor 20 is used in the embodiment shown. One such motor is the AmpFlow A28-150. The motor may be used with a radio transmitter and receiver. The transmitters and receivers are able to wirelessly control one motor or two or more motors independently. Another motor which can be used in the AmpFlow A28-400 motor. When used with a single 12V battery, instant acceleration in all directions is achieved with a high degree of control. When used with a 24V battery, a maximum speed of 4 m/s was achieved. Regardless of the motor used, the motor 20 must be sized to fit within the frame 46.

The speed and acceleration of the device is dependent upon many factors, including the size of the device, the type of ball drive, the size of the motor, etc. In the embodiment shown, the device is designed to operate at a speed of at least 3 m/s and an acceleration of at least 3 m/s$^2$, with preferred speeds of 5 m/s or greater and preferred accelerations of 7 m/s$^2$. However, in other embodiments the speeds and accelerations may vary. The device is also designed to have less than a 10% loss of speed in all playable weather conditions.

The batteries and battery system for the device 10 must be of the type which are non-spillable and which are designed to be depleted and recharged many times. One such illustrative battery is a lead-acid absorbed glass mat (AGM) battery. Such batteries are deep cycle batteries which are designed to be completely drained and then recharged. These types of batteries are non-spillable and can be used in any orientation because the electrolyte is held in glass fiber mats instead of floating freely. In one embodiment, a single 24-volt deep cycle battery can be used. Alternatively, other sizes of batteries can be used, such as, but not limited to, two 12-volt batteries connected in series. An example of such a battery is the MC-545 battery which weighs approximately 10 lbs and has a capacity of 14 Ah. In one embodiment, full throttle for the device runs at approximately 50 amps, whereby two MC-545 batteries have the capacity to run at full throttle for around 17 minutes. Given that the device 10 will be going at full speed only a fraction of the time, this will provide sufficient capacity for the device 10 to last for a typical twenty (20) minute tackling practice session.

The control system includes a transmitter, antenna, receiver, battery(ies), speed controllers and motor(s) 20. In various embodiments, the type of motor 20 chosen dictates what type of control system could be used. In one illustrative embodiment, a radio frequency controller is used. In one illustrative embodiment, an AmpFlow Dual Motor Speed Controller is used. Such a controller can run at 24 volts and provide a 5 volt power output designed for wireless receivers. In one illustrative embodiment, a Planetary Rover Radio Control, which includes a pre-paired transmitter and receiver, can be connected directly into the speed controller. Once connected, the speed controller can be programmed for channel mixing, meaning that both motors are controlled via a single joystick or other known devices, such as, but not limited to, a pistol grip, two sticks, triggers. The single joystick allows the user to drive the device 10 in any direction using an intuitive control system. The control system is designed to allow for a minimum travel distance of greater than 25 meters, with a preferred distance of greater than 100 meters, allowing the coach to operate the device 10 from anywhere on the field.

As best shown in FIG. 1, the illustrative device 10 has high density foam 14 around the base 52 of the device 10 and lower density foam 16 for the upper portion 54 of the dummy or device 10. Foams may be open-cell foams or closed-cell foams. Open-cell foams have gas pockets which are connected to one another, creating a lower density. In contrast, closed-cell foams have isolated gas pockets for a more rigid high-density shape. The high density, closed cell foam 14 around the base 52 is used to cushion against the frame 46 and provide protection for the electronics. The high density, closed cell foam 14 also provides structure for the self-righting nature of the dummy or device 10. The low density, open-cell foam 16 for the upper portion 54 is used where the primary impact area will be.

One such representative high density foam 14 is sold under the brand of Minicell. In one embodiment, the high density foam 14 is provided in a bowl shape to encase the frame 46 and allow the device or dummy 10 to be self-righting. In one embodiment, the bowl shaped foam was constructed in two hemispheres that are connected around the frame or cage 46 via two straps. This modular design provides easy access to the electronics and drive system for maintenance, as the two halves can be swiftly disconnected and removed.

The upper portion 54 of the device 10 has a humanoid formed pad 16, although other configurations can be used without departing from the scope of the invention. The upper portion 54 is configured to encourage safe tackling at the correct contact height by reflecting the proportions of an average player in an exaggerated manner. This foam 16 must be significantly softer on impact than the base foam 14, yet rigid enough to hold its shape. While different types of foam 16 can be used, in one embodiment, a castable urethane foam is used. One such foam is the 3 lb/ft$^3$ FlexFoam-iT III foam. The shape of the upper portion can be cast in one piece or in two identical halves which are fused together. Based on player safety and other testing, the high density foam 14 has a density between 4 lb/ft$^3$ and 6 lb/ft$^3$ and the low density foam 16 has a density between 2 lb/ft$^3$ and 4 lb/ft$^3$, although other densities of the high density foam and the low density foam may be used.

In the embodiment shown, a structural element 56 is provided for supporting the upper portion of foam 16. The structural element 56 also provides a robust connection between the frame 46, the upper portion 54 and the lower portion 52. The structural element 56 is a rigid but slightly flexible cylinder or post made from high density polyurethane. However, in other embodiments, other materials such as a steel beam or pipe may be used for the structural element 56. This material is highly durable, able to sustain a high force impact and is designed to restore itself to vertical after bending. The structural element 56 is bolted to the frame 46 of the device or dummy 10 and the two halves of the upper portion 54 are affixed thereto by glue or other known fasteners. However, other known methods of fastening the structural element 56 to the frame 46 and the upper portion 54 can be used without departing from the scope of the invention.

The foam 14, 16 may be painted and/or the foam may be coated in shrink film or other durable coating to provide a durable, uniform and aesthetically pleasing finish. In one illustrative embodiment, the coating may be a self-skinning polyurethane such that the outer skin protects and increases durability of softer inner foam and allows for more secure attachment of components. In another illustrative embodiment, the softer upper foam may be covered by a weather proof vinyl.

The device 10 is configured to be sufficiently tall and heavy enough to provide a realistic visual target and realistic tackling resistance for players. In one embodiment, the device 10 has a weight of approximately 188 lbs and a height of approximately 63 inches.

In order for football practices to run efficiently, the device or dummy 10 must be able to be reset quickly between repetitions of a drill. This time was quantified as 4 seconds, based upon calculations from observing football practice. As previously described, the device 10 is constructed to have a weight distribution such that it is passively self-righting. Therefore, depending upon the weight of the components and foam 14, 16 used, additional weight may be added to the bottom portion to ensure that the device 10 is self-righted in 2 second, 3 seconds, 4 seconds or less than 5 seconds. In order to mitigate improper stabilization resulting in wobble when driving, weights may be added to the frame 46, which will stabilize the device or dummy 10 and assist in self-righting. The weights may be any component or contained material which adds weight, such as, but not limited to, sand and water. Widening the contact area with the field will also increase the device's 10 stability. Wobbling could also be mitigated by designing a suspension system that produces a restorative force for the device or dummy 10.

Referring to the illustrative embodiment shown in FIGS. 7-16, the device 110 is driven by a diwheel drive system 118, although other drive systems such as, but not limited to, ball drive, multi-ball drive, wheel based or track based systems may be used without departing from the scope of the invention.

Figure 9:
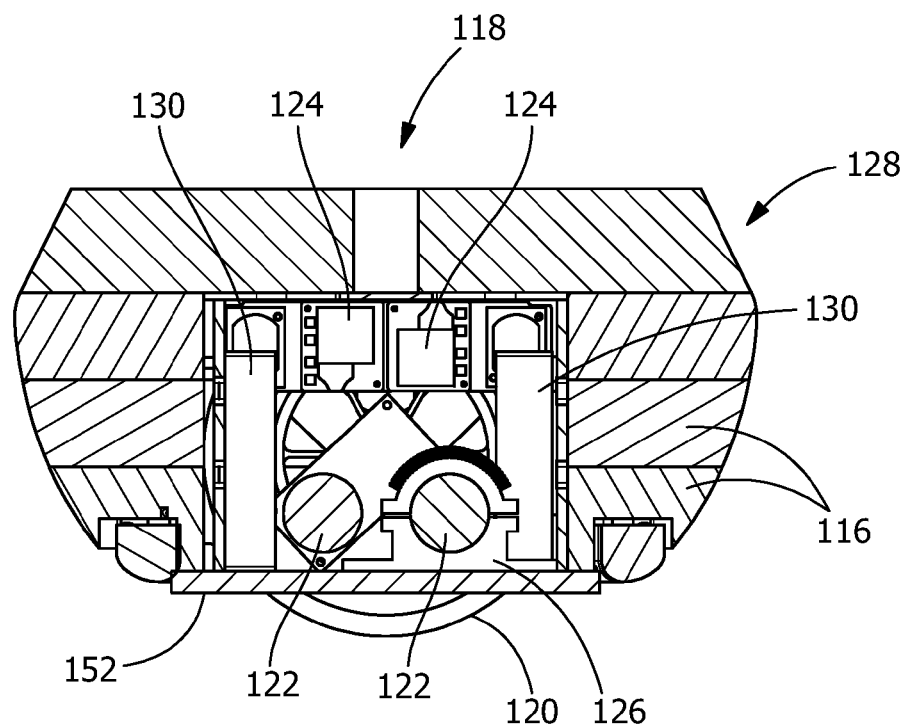
FIG. 9 is a cross section of the base of the mobile device taken along line 9-9 of FIG. 7.
Figure 11:
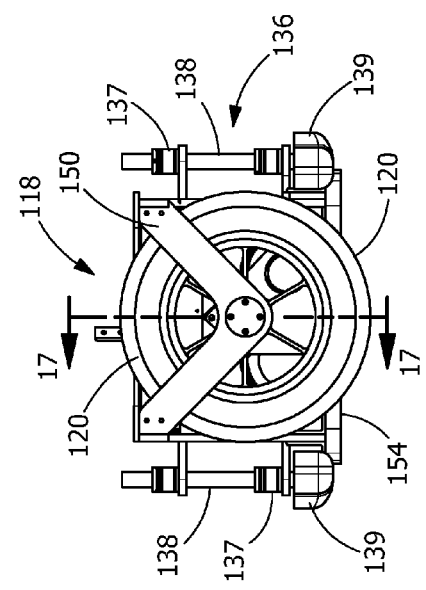
FIG. 11 is a front view of the base with the cover removed, as shown in FIG. 10.
Figure 12:
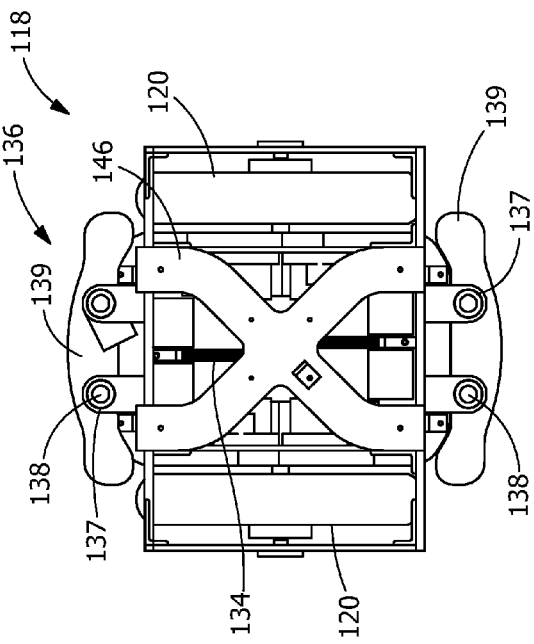
FIG. 12 is a side view of the base with the cover removed, as shown in FIG. 10.
Figure 13:
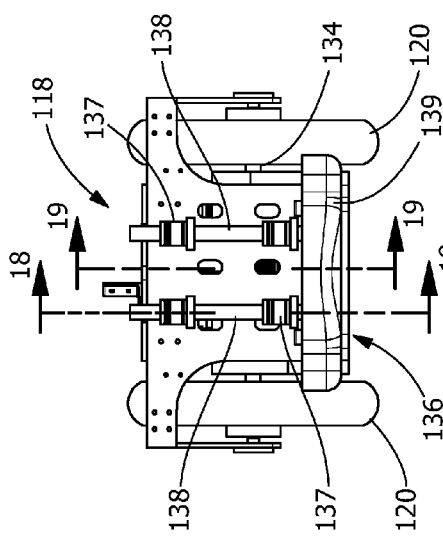
FIG. 13 is a bottom view of the base with the cover removed, as shown in FIG. 10.
Figure 16:
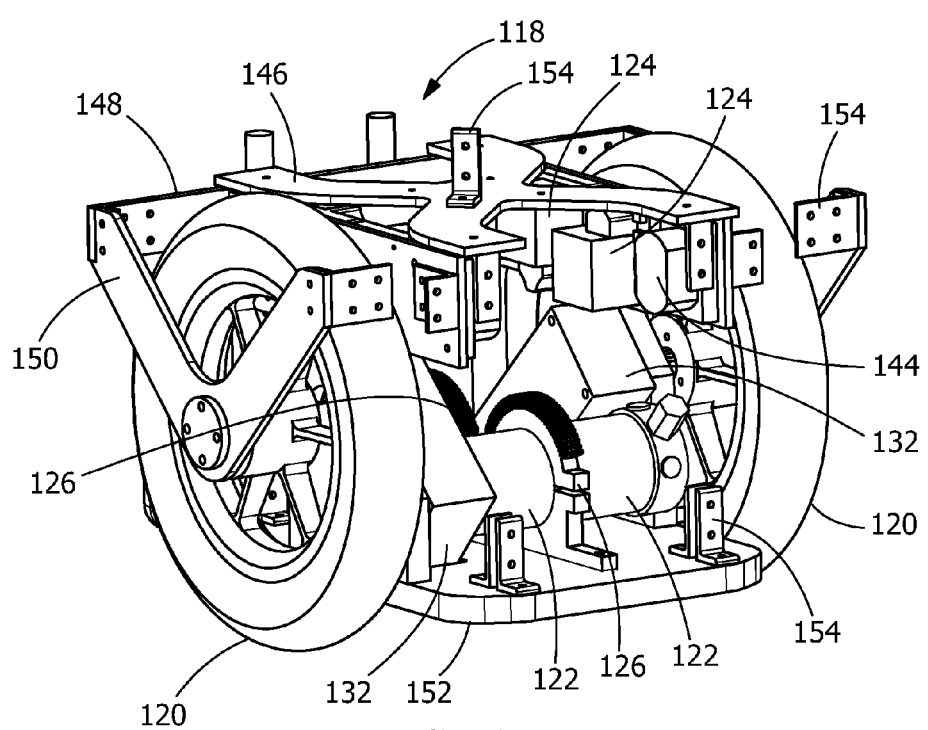
FIG. 16 is a perspective view of the base with a cover removed, as shown in FIG. 10, with various components removed to better view the drive mechanism.
Figure 17:
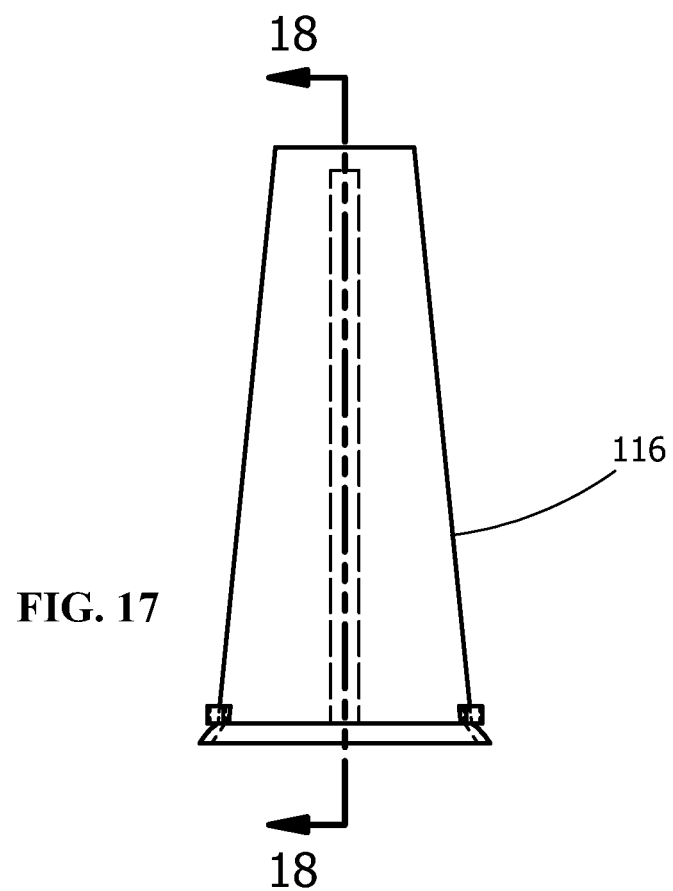
FIG. 17 is a front view of an illustrative embodiment of an upper portion of the mobile device according to the present invention, the upper portion is positioned on the base when in use.
Figure 18:
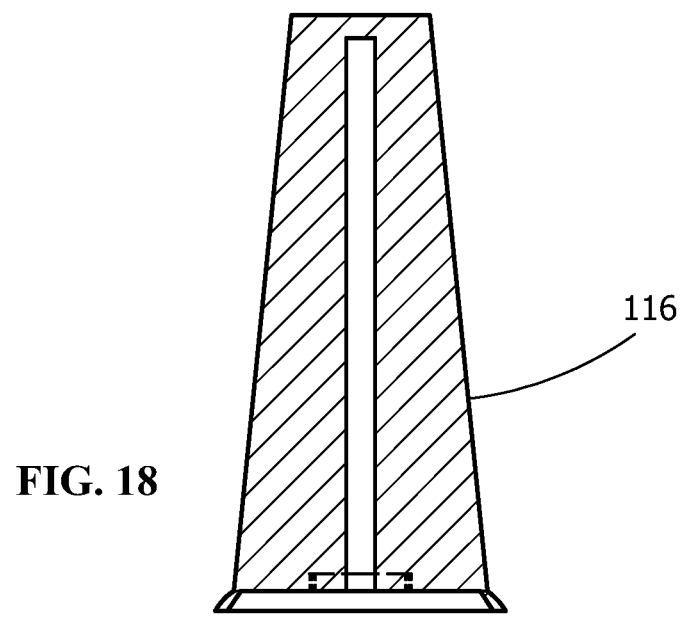
FIG. 18 is a cross view of upper portion of the mobile device taken along line 18-18 of FIG. 17.

As best shown in FIGS. 9 and 16, the diwheel drive system 118 includes two parallel fixed axle wheels 120 where each wheel 120 in the diwheel design is powered by an independent motor 122 and electronic speed controller 124, allowing for independent rotational velocity control to facilitate turning including rotation in place without translation. The wheels 120 are driven by the motors 122 using gearboxes 132 attached to the drive shaft 134, as is known in the art. The diwheel drive system 118 allows rapid drill pace, with the motor 122, gearbox 132, wheel 120 combination allowing proper torque and wheel speed reduction to meet human speed and agility quantifications. This allows rapid and easy replication of any drill being performed. The symmetric design allows the dummy to also be used identically in both forward and reverse to facilitate ease of operation and simulate realistic motion.

The motors 122 are easily controllable and can provide ample force. Batteries 130 are used as the power source because they are portable and are a safe power source that will work in all weather conditions. Circuit breakers or fuse switches 144 are provided for additional safety. In the preferred embodiment, the device 110 is controlled using a remote control system, allowing for maximum mobility and precision.

The drive system 118 is properly sealed/encased to protect against variations in weather and infiltration from debris at location of use. The drive system 118 is properly ventilated, through the wheel wheels or other paths and incorporates exposed heat sinks 126 to reduce temperature increase during use. Temperature is also monitored by sensors or other mechanisms to ensure safe operational function. Thermistors and on board sensors measure motor temperature and limit function to maintain safe operating temperatures. Should the temperature exceed design limits, operation can be temporarily suspended.

In various embodiments, the diameter of the wheel 120 is as large as possible while still fitting in padded drive system base 128 (FIGS. 7-9) to allow traction on all playing surfaces and to match the round shape of the modular bottom or base thereby not inhibiting its self-righting nature. The larger wheel diameter also provides a larger contact surface with the playing surface, thereby decreasing field degradation as well In any of the exemplary embodiments, the wheels may be made of rubber or other material which provides the required coefficient of friction with the surface on which the device is to be used. In addition, the wheels may be textured or may include studs to increase the coefficient of friction.

In all of the embodiments, the wheels may be of various sizes depending upon the size of the device and the type of drive used. The drive system must have adequate traction on the field, particularly in wet conditions. Artificial turf has a higher coefficient of friction than natural grass and does not become as slippery when wet. An illustrative embodiment has a coefficient of friction with the turf of greater than 0.35, greater than 0.5 or greater than 0.7.

The base 112 of device 110 includes supports and structural elements to provide the required rigidity to protect the components housed in the base 112. The supports include top supports 146, side supports 148, wheel supports 150 and bottom supports 152. Mounting members or brackets 154 are provided at various locations on the supports. The mounting brackets 154 are used to secure the base pads 114 to the base 112.

In the illustrative embodiment, the base 112 is elliptical to provide stability in the direction of motion but still self-righting over specific aspects of the form and designed to passively return to those aspects.

Figure 20:
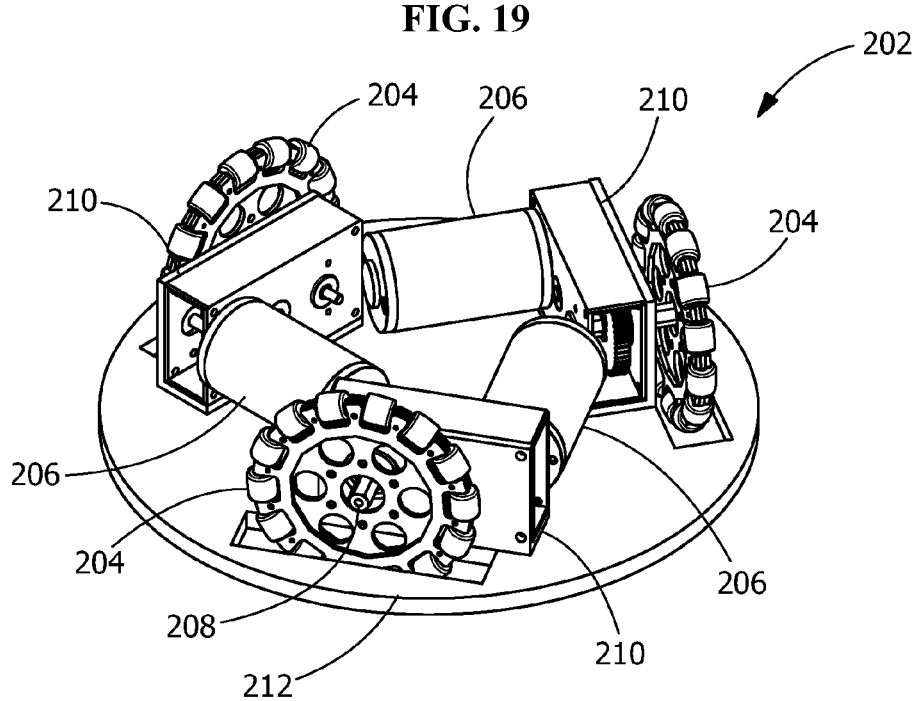
FIG. 20 is a perspective view of a third alternate illustrative embodiment, a base of a mobile device which simulates human motion according to the present invention.

In another illustrative embodiment, as shown in FIG. 20, the drive system is an omni-wheel drive system 202. This drive system 202 uses multiple omni-wheels 204, with the omni-wheels 204 contacting the ground directly and providing the motive force. In the embodiment shown, three wheels, oriented 120 degrees apart from each other are shown. However, other embodiments, such as, but not limited to, four wheels oriented 90 degrees from each other may be used. Each wheel 204 is able to be driven independently, with the result that the device 110 can be driven in any direction regardless of rotational alignment. An objective of drive system 202 is to enable direct and nearly instantaneous lateral movement without the need for rotational re-alignment of the device 110 relative to the ground (quick lateral cuts). In the embodiment shown, each wheel 204 is powered by a motor 206 connected to a drive shaft 208 through a gear box 210. The wheels 204 extend through openings in a mounting plate 212.

Figure 21:
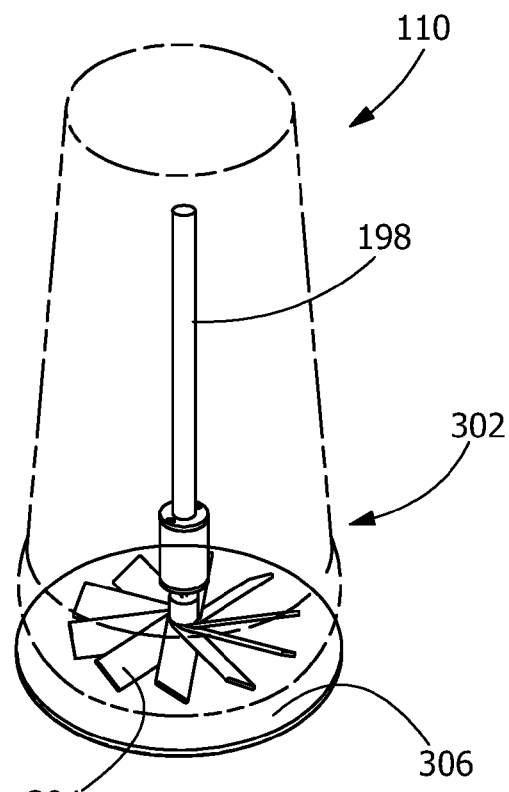
FIG. 21 is a perspective view of a fourth alternate illustrative embodiment, a base of a mobile device which simulates human motion according to the present invention.

In another illustrative embodiment, as shown in FIG. 21, the drive system is a hover system 302 which utilizes blowers/fans 304 to produce a substantial volume of air slightly above atmospheric pressure to create lift below the device 110. A flexible skirt or curtain 306 encloses the produced air to create the lift and drive. The air contained within the curtain 306 may be circulated through slots/perforations (not shown) to provide stability.

Figure 22:
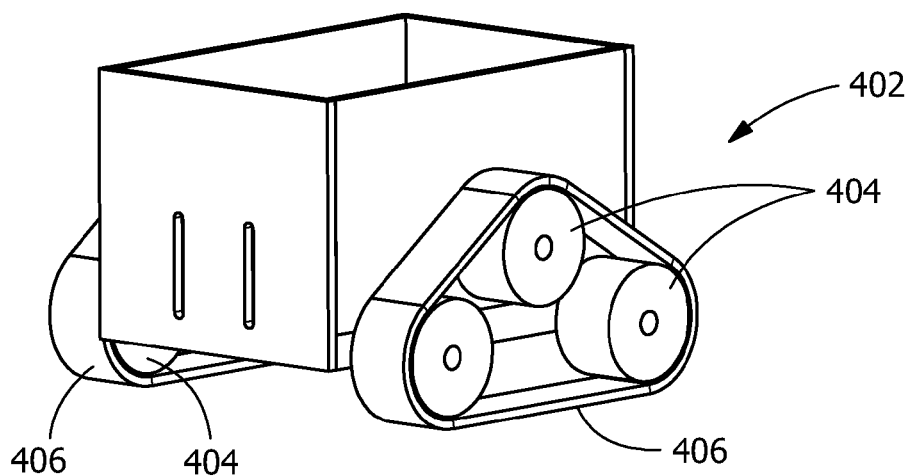
FIG. 22 is a perspective view of a fourth alternate illustrative embodiment, a base of a mobile device which simulates human motion according to the present invention.

In another illustrative embodiment, as shown in FIG. 22, the drive system is a tank drive system 402 with sprockets 404 and treads 406 which contact the ground. Each tread 406 is able to be driven independently, with the result that the device 110 can be driven in any direction regardless of rotational alignment. In the embodiment shown, at least one sprocket 404 of each tread 406 is powered by a motor (not shown) connected to a drive shaft (not shown) through a gear box (not shown).

Other types of drive systems can be used without departing from the scope of the invention. Such systems include, but are not limited to, mecanum wheel drive systems.

Self-righting components, such as weight, may be added to and removed from the device 110 to influence performance characteristics by adapting both the overall weight and adjusting the center of gravity. In one actualization, dynamic weight is added providing a dynamic center of gravity to improve performance in turning maneuvers and to adjust the center of gravity prior to and after the device 110 has been tackled. The weight may be changed by adding or removing discrete weights. In addition, other methods may be used to alter the weight of the device 110, such as, but not limited to, changing the shape and/or material used for various components.

In an illustrative embodiment, gravity is used to reset the device 110 after the device 110 has fallen to the ground. As the device 110 is self-righting, no additional motors or other devices are required for this function. In order to accomplish this method of reset, the geometry and weight distribution of the pads 115, 117 of the device 110 allows the device 110 to be passively self-righting, allowing for the quick repetitions of drills that are required during use.

In order to run efficiently, the device must be able to be reset quickly between repetitions of a drill. For football, this time was quantified as 4 seconds, based upon calculations from observing football practice. As previously described, the device is constructed to have a weight distribution such that it is passively self-righting. Therefore, depending upon the weight of the components and foam used, additional weight may be added to the bottom portion to ensure that the device is self-righted in 2 second, 3 seconds, 4 seconds or less than 5 seconds. In order to mitigate improper stabilization resulting in wobble when driving, weights may be added to the frame, which will stabilize the device and assist in self-righting. Widening the contact area with the field will also increase the device's stability. Wobbling can also be mitigated by designing a suspension system that produces a restorative force for the device, as previously described.

In alternative illustrative embodiments, self-righting may also be achieved by other self-righting components, including, but not limited to, dynamic center of gravity with a mobile mass inside the device or with a flywheel 156 (FIG. 19) to add restorative force. The same means may be used to temporarily disable self-righting capabilities when useful for training purposes. Additionally, the flywheel 156 can be used to increase performance during regular driving or drills.

In alternative illustrative embodiments, self-righting may also be achieved by the incorporation of a weighted rotating element, such as a disc or wheel, to provide angular momentum that resists tipping (gyroscopic effect). Said rotating element could be powered by electric motors and batteries, and it could be placed as far below the center of gravity as possible (i.e. near the base of the drive system) to further add to righting moment.

In alternative illustrative embodiments, balancing may also be achieved by gyroscopes and accelerometers that feedback into wheel position.

Self-stabilizing components, such as weight, may be added to and removed from the device 110 to influence performance characteristics by adapting both the overall weight and adjusting the center of gravity. In one actualization, dynamic weight is added providing a dynamic center of gravity to improve stability and performance in turning maneuvers and to adjust the center of gravity prior to and after the device 110 has been tackled. The weight may be changed by adding or removing discrete weights. In addition, other methods may be used to alter the weight of the device 110, such as, but not limited to, changing the shape and/or material used for various components.

In an illustrative embodiment, gravity is used to facilitate stabilization of the device 110. In various embodiments, the geometry and weight distribution of the pads 114, 116 and other components of the device 110 are sufficient to provide the required stability, thereby allowing the device to passively self-stabilizing with no additional motors or other devices required.

Depending upon the weight of the components and foam used, additional weight may be added to the bottom portion to ensure that the device is self-stabilizing. In various embodiment, in order to mitigate improper stabilization resulting in wobble when driving, weights may be added to the frame, which will assist in stabilization. Widening the contact area with the field will also increase the device's stability. Wobbling can also be mitigated by designing a suspension system that produces a restorative force for the device, as previously described.

In alternative illustrative embodiments, self-stabilization may also be achieved by other self-righting components, including, but not limited to, dynamic center of gravity with a mobile mass inside the device or with a flywheel 156 (FIG. 19) to add restorative force. Additionally, the flywheel 156 can be used to increase performance during regular driving or drills.

In alternative illustrative embodiments, self-stabilization may also be achieved by the incorporation of a weighted rotating element, such as a disc or wheel, to provide angular momentum that resists tipping (gyroscopic effect). Said rotating element could be powered by electric motors and batteries, and it could be placed as far below the center of gravity as possible (i.e. near the base of the drive system) to further add to the stabilization of the device.

In alternative illustrative embodiments, stabilization may also be achieved by gyroscopes and accelerometers that feedback into wheel position.

Figure 14:
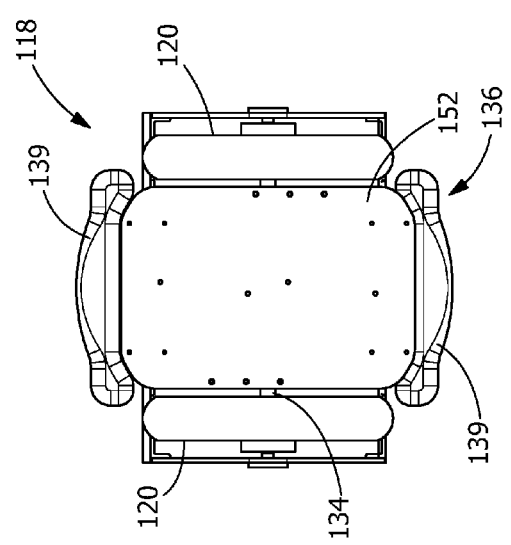
FIG. 14 is a top view of the base with the cover removed, as shown in FIG. 10.
Figure 15:
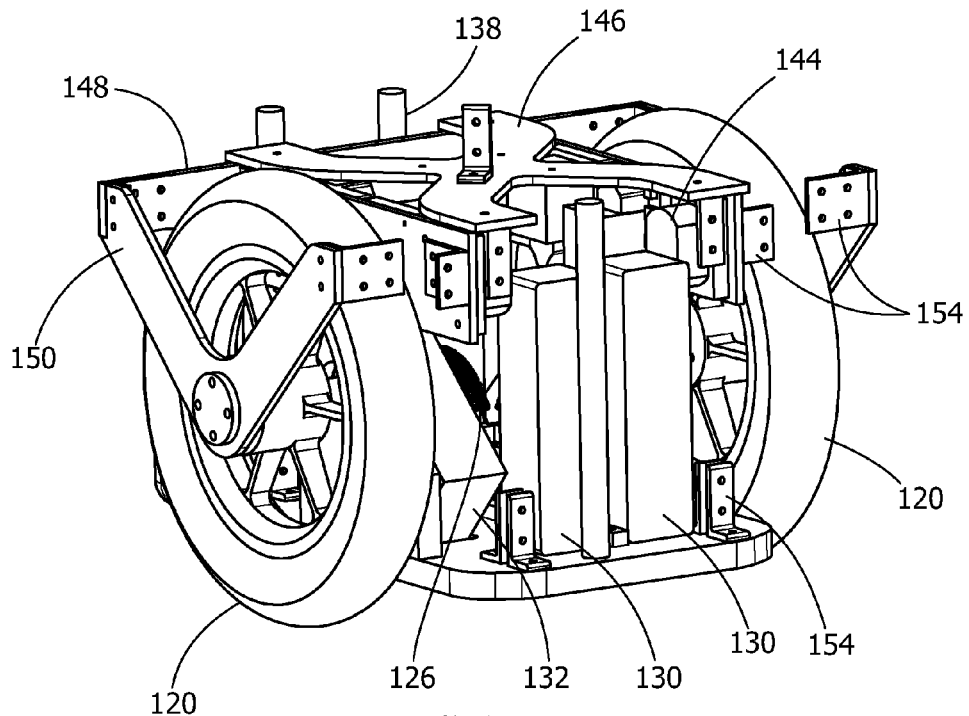
FIG. 15 is a perspective view of the base with a cover removed, as shown in FIG. 10, with a front plate removed.
Figure 19:
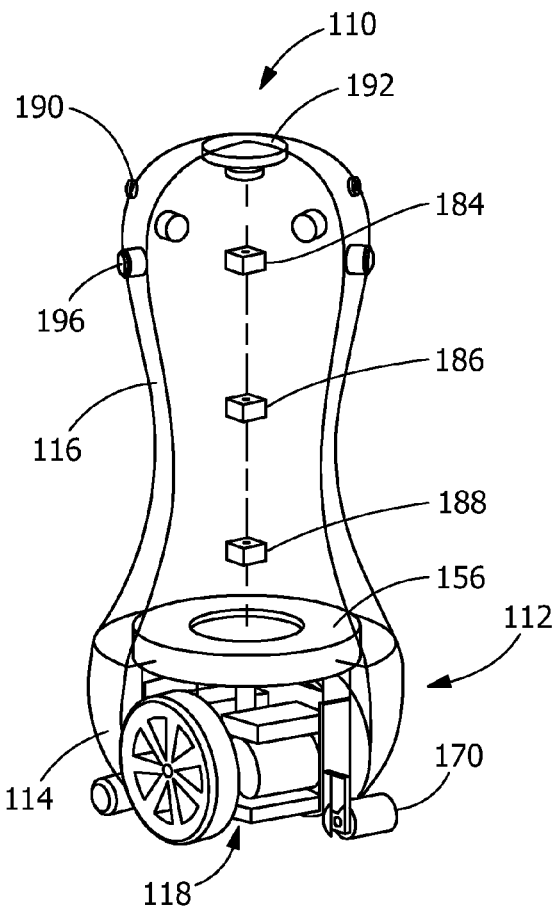
FIG. 19 is a perspective view of a second alternate illustrative embodiment, a mobile device which simulates human motion according to the present invention.

In the illustrative embodiment shown in FIGS. 14-16, the shape of the top or upper portion 116 or pads is conical. However, other shapes may be used, including, but not limited to, a humanoid form figure (as illustrated in FIG. 19) or a realistic-looking target. The shape of the pads can provide realistic-looking targets and can reinforce safe procedures.

The upper portion 116 of the device 110 is removable/exchangeable, allowing for easy replacement of the upper portion 116 if needed. This allows the upper portion 116 to be customized to enhance its effectiveness in various scenarios. The quick release and change feature allows for alternative functions, such as, but not limited to, quarterback, receiver, running back etc., of the device 110 to be implemented quickly. This also allows for exchange of colors and design which is useful for representing different players or teams. The removable/exchangeable aspect of the upper portion 116 also provides access to the drive system 118 and electronics in the hull, bottom or base portion of the device 110. While the upper portion 116 of the device 110 is removable/exchangeable, the upper portion 116 is secured to the base 112 during operation, thereby preventing the unwanted or inadvertent removal or separation of the upper portion 116 from the base 112. The upper portions 116 may be secured to the base 112 through mounting components 154, such as, but not limited to brackets, zippers, buckles, or fasteners. In various illustrative embodiments, the pads and drive system are always connected and are never separate during normal operation.

In the illustrative embodiment shown, the drive system 118 is provided where the wheels 120 are mounted without suspension. A suspension component or system 136 is added both in front and behind the axis of rotation of said wheels 120 to resist axial rotation of the body of device 110 around said axis during rapid acceleration and deceleration. This component 136 restores the device 110 to a completely vertical position while dampening oscillation and maintaining maximum normal force on said wheels 120 from the ground to maintain traction. Suspension is a beneficial component of an agile and mobile device 110. Suspension is beneficial for both forward and reverse as well as cornering. As best shown in FIGS. 11-14, one embodiment of the suspension system 136 includes one or more vertical shafts 138 mounted to the base 112. Compression springs 137 are provided on the vertical shafts 138 to maintain the proper positioning of the shafts 138 relative to the base 112. Casters or sliders 139 are provided at the bottom of the shafts 138. The casters or sliders 139 make contact with the ground when the device 110 is tilted or turned to provide the necessary stability and facilitate the self-righting aspect of the device 110.

Figure 23:
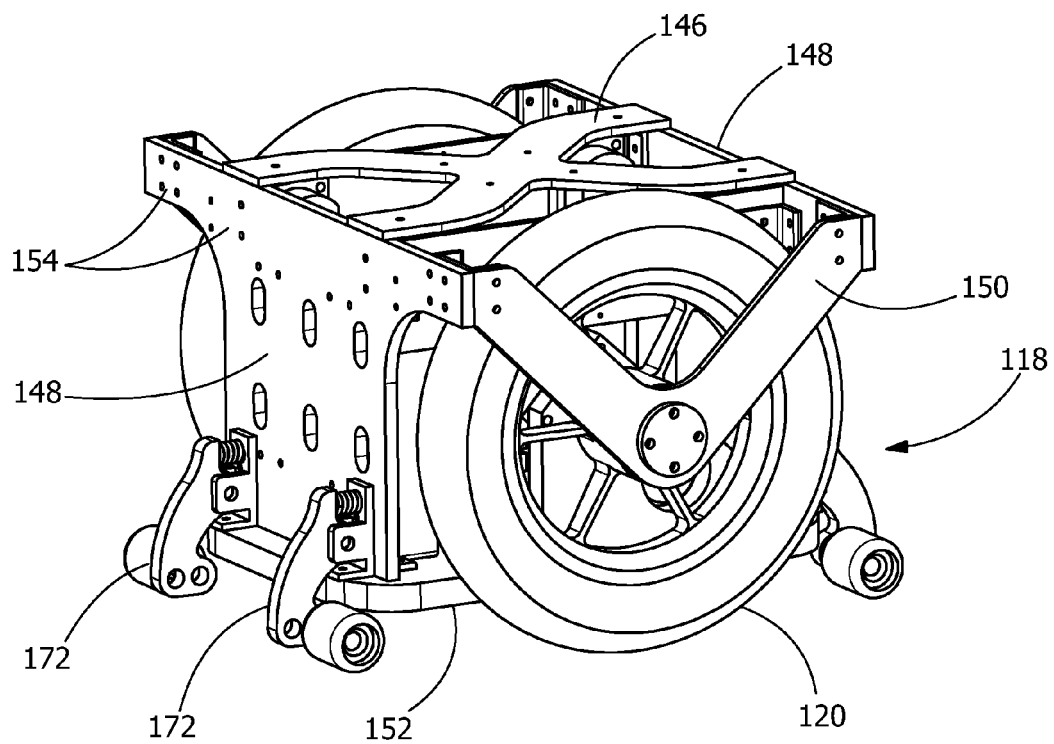
FIG. 23 is a perspective view of a fifth alternate illustrative embodiment, a base of a mobile device which simulates human motion according to the present invention.

Other examples of the suspension system 136 include, but are not limited to: a hydraulic shocks; inflatable air bladder 168 (FIG. 25); rollers on a vertical shaft 170 (FIG. 19); swing arm design with resilient members, such as compression springs/hydraulic shocks/air bladder 172 (FIG. 23); flex arm design-steel leaf spring, fiberglass rod; and torsion resistant fixed swing arm. Alternatively, an integrated suspension system is part of foam padding with or without an inflatable bladder.

Suspension allows passive oscillation during velocity and direction changes that assists in realistic or real life movement simulation termed "juking" or "shake", while maintaining desired performance characteristics. Properties such as stiffness and position/depth relative to the base of the device of the suspension system may be adjusted to influence performance on different surfaces.

In another illustrative embodiment, the device 110 is used without suspension, whereby controllers maintain stability of the foam on top of the wheels without physical external stabilization forces.

Figure 24:
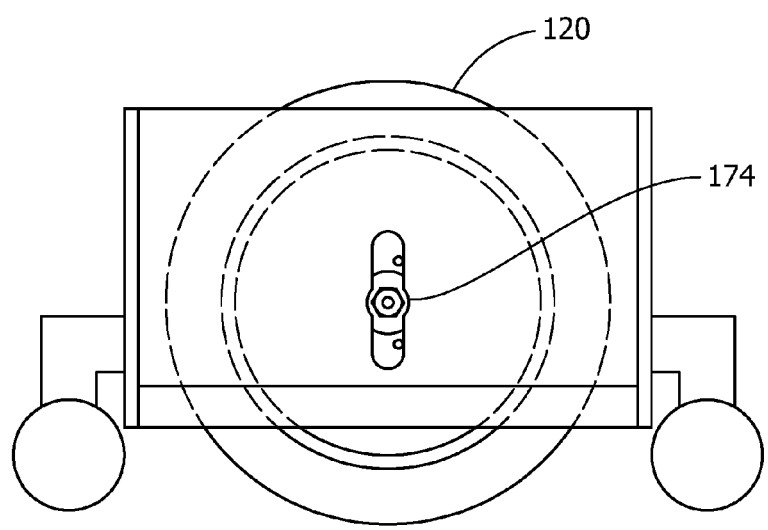
FIG. 24 is a perspective view of a sixth alternate illustrative embodiment, a base of a mobile device which simulates human motion according to the present invention.

In another illustrative embodiment, the diwheel has axles which include suspension and/or camber 174 (FIG. 24) to adjust the traction and control to improve performance.

Various types of motors 122 and power sources may be used without departing from the invention. As an example, a 3 hp motor may be used. One such motor is the AmpFlow A28-150. Another motor which can be used is the AmpFlow A28-400 motor. When used with a single 12V battery, instant acceleration in all directions is achieved with a high degree of control. When used with a 24V battery, a greater maximum velocity may be achieved. The motor choice shall not be limited to these two types rather the motor choice in conjunction with gear ratio and wheel size shall maintain the desired acceleration and top speed mentioned above.

The speed and acceleration of the device is dependent upon many factors, including the size of the device, the type of drive, the size of the motor, etc. The drive specifications may be specifically tailored to the user base. Examples of such user base may include, but is not limited to, adult football players, children lacrosse players, hunters or police. The device is also designed to have less than a 10% loss of speed in all playable weather conditions.

In an illustrative embodiment, the batteries 130 and battery system for the device 110 are of the type which are non-spillable and which are designed to be depleted and recharged many times. One such battery is a lithium polymer battery. In various embodiments, a minimum of 13,000 mAh of on board battery storage is needed to ensure one charge lasts a practice. While charging, each cell must be individually monitored or "balanced" such that they are all nearly equal. The batteries must be encased in a fire resistant case during charging for proper safety. The batteries may be quickly replaced in the event charging is not possible during use.

Alternative embodiments of a power supply system include, but are not limited to: other rechargeable batteries (lithium polymer or other composition); charging port which is accessible from the exterior of the device; on-board battery chargers; on-board battery balancers; on-board battery monitors; removable rechargeable batteries; tethered for power to an electrical source or outlet; combustion; induction; hydraulic; or compressed air.

Figure 25:
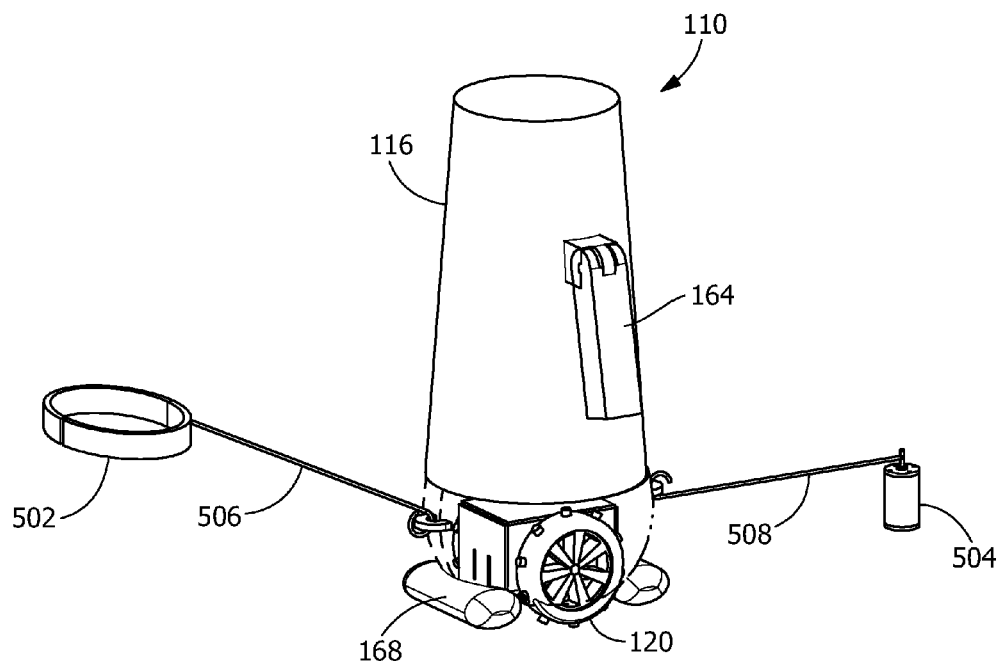
FIG. 25 is a perspective view of a seventh alternate illustrative embodiment, a mobile device which simulates human motion according to the present invention.

In addition, the device 110 may be driven by a human or additional motorized vehicle as represented in FIG. 25. In this embodiment, the device 110 includes an attachment 502 for connecting to the external device or person. The attachment 502 is connected to the device 110 by a cable, rope or tether 506. A winch 504 is provided for return motion of the device 110. The winch 504 is connected to the device 110 by a cable, rope or tether 508. Attachment points may also allow the device 110 to move other field equipment.

Figure 26:
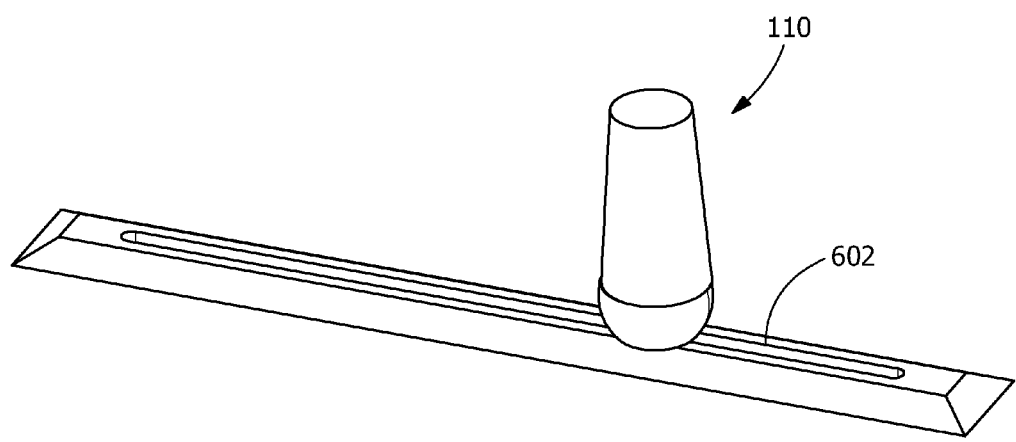
FIG. 26 is a perspective view of an eighth alternate illustrative embodiment, a mobile device which simulates human motion according to the present invention.

The device 110 may also be driven and/or motion controlled by a track 602, as shown in FIG. 26. In such an embodiment, the device 110 may be powered by a motor within the device 110, a motor within the track 602 or by some other device linked to the track or device. The device 110 is flexibly connected to the track 602 to allow the device 110 to be pushed toward a horizontal position and to be restored to an upright or vertical position.

Figure 29:
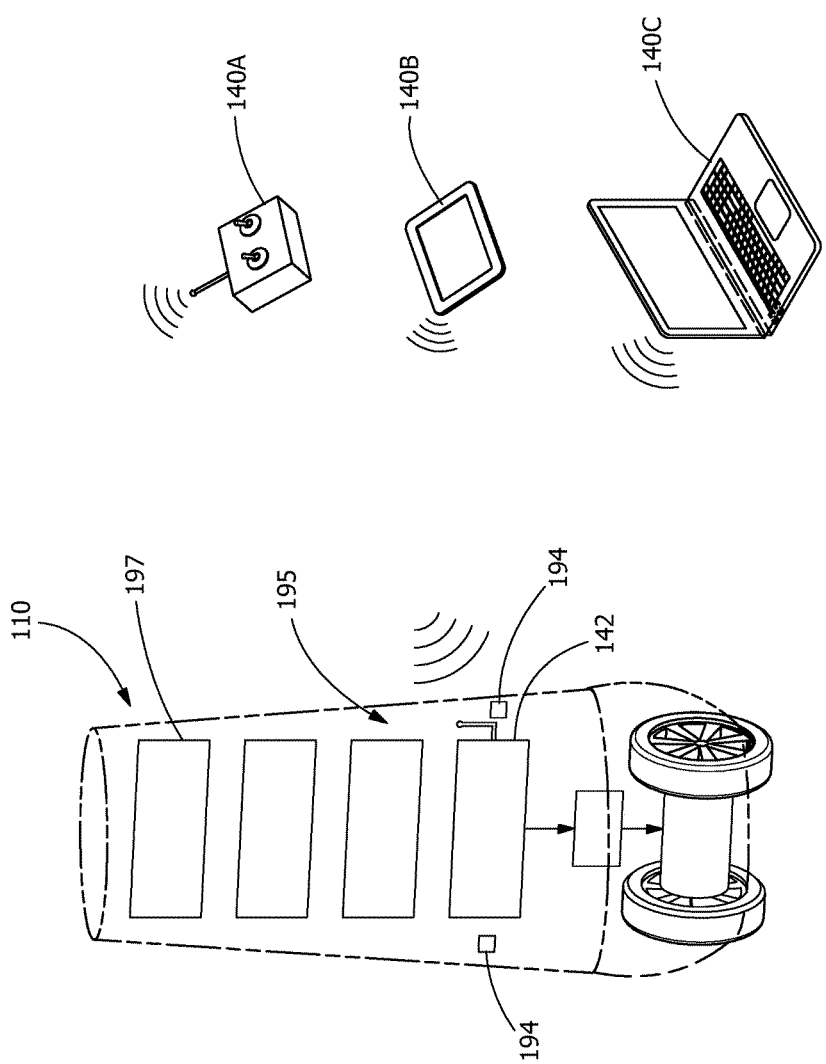
FIG. 29 is a diagrammatic view of a mobile device with representative controller illustrated.
Figure 30:
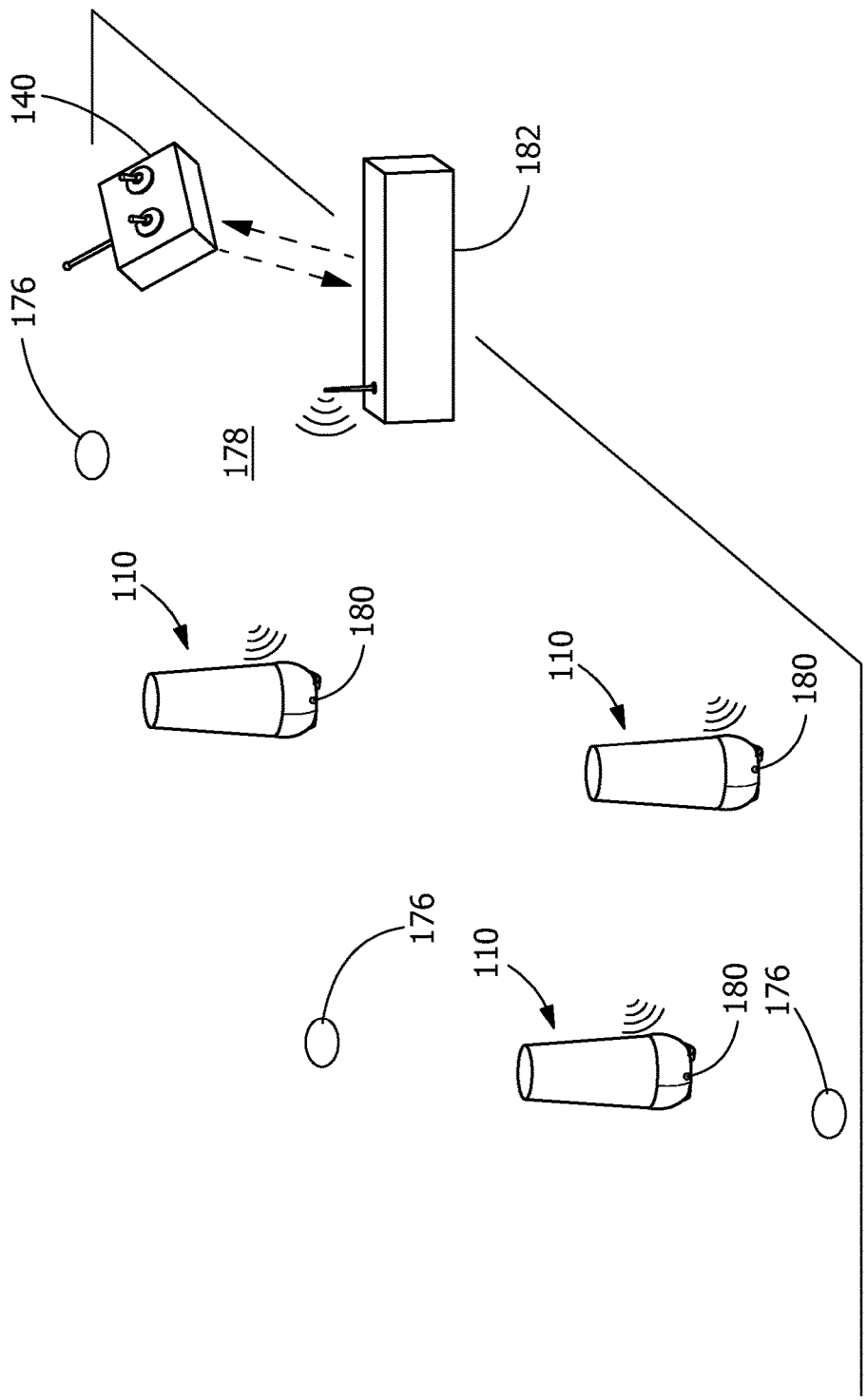
FIG. 30 is a diagrammatic view of multiple mobile units in an area, the mobile units being controlled remotely.

As best shown in FIGS. 29-30, the device 110 may be controlled by various methods or devices. In one illustrative embodiment, a single device is controlled by single remote utilizing RC, Wi-Fi or Bluetooth, whereby direct control is necessary during all device use. The remote may be stand-alone or developed in app structure for mobile or computational device access. As shown in FIG. 29, a transmitter 140, which may be, but is not limited to, a handheld controller 140A, a touch screen device 140B or a computer 140C. The transmitter 140 communicates with a receiver or processor 142 provided in the device 110 to control the device 110.

In another illustrative embodiment, the control is in pre-programmable functions, where predetermined routes of travel and performance can be chosen and executed. This embodiment allows for autonomous performance of preprogrammed routes or behavior. Simultaneous control of multiple devices from single control center can simulate entire array of motion to replace a practice squad.

At times, the steering and handling characteristics of the mobile device 110 may be difficult to control or unstable as users attempt to pursue and perform complex maneuvers or routes. Such control issues may be lessened by the non-dynamic systems and components described in this application. In addition, the mobile device 110 may include a traction control or driving assist feedback system 195, an illustrative embodiment of which is shown in FIG. 29. In this embodiment, the system measures motion of the mobile device 110 using one or more sensors 197, such as, but not limited to, angular rotation and acceleration rates of the device to actively manipulate one or more controls of the mobile device 110 through the use of processor or controller 142, including, for example, steering, throttle, braking, or any other device that may affect handling and control. As an example, in operation, the one or more sensors 197 are configured to receive angular rotational information associated with the rotation of the mobile device 110. The processor or controller 142 is configured to receive the angular rotation information associated with the rotation of the device from the one or more sensors 197 and, in turn, control a wheel speed of the mobile device 110 based at least in part on the received angular rotation information.

The sensors 197 may include one or more sensors configured to detect information about the environment surrounding the mobile device 110. For example, the sensors 197 may include one or more of a Global Positioning System (GPS), an inertial measurement unit (IMU), and/or a camera. Sensors 197 may also include sensors configured to monitor internal systems of the mobile device 110 and measurements (e.g., pitch, yaw, and roll angles) of the mobile device 110 (e.g., wheel speed sensors, wheel direction sensors, etc.). In some embodiments, sensors 197 may also include one or more gyroscopes or accelerometers, each configured to determine (or measure) rotational information about various axes of mobile device 110. Additionally, in some embodiments, one or more of the sensors 197 may be utilized or activated separately and/or collectively to modify a position and/or an orientation of the mobile device 110.

The device may have an internal, automatic shutoff device to disable motion in case of malfunction, fail safe if out of RC range, zero speed, etc. Such a shutoff may also be used to disable motion or turn off motors of the device or if the device is operating outside of proper operating parameters or after events, such as, but not limited to: human contact is made; the batteries are low; the temperature of the device or any of the components is not in an acceptable range; the device is toppled and does not self-right; the device loses communication with the controller.

In various illustrative embodiments, as illustrated in FIG. 30, the device 110 may sense a system or array of positional reference markers 176 deployable on or near a playing field 178 that allows one or more devices to remotely register location and orientation on the field by means of a positional tracker (such as a GPS) or special recognition sensor 180. The sensor 180 may receive signals from the transmitter 140 by way of a base station 182.

In other embodiments, as illustrated in FIG. 19, the device 110 has a positional sensor 184 in order to orient itself on the field or orient itself to the driver; has internal motion sensors 186 which sense current speed, position, justification; utilizes tachometers and accelerometers to facilitate ease of control; has sensors 188 which measure impact, such as impact or force a player or ball generates against the device; and has the ability to collect any desired data by addition of sensors to the control system; or a combination thereof. The sensors allow the strength and location of contact on the device 110 to be measured and tracked. An RFID or other similar device provided on the participant can also cooperate with the sensors of the device 110 to allow the participant making contact with the device to be identified and recorded.

The device 110 may include a mechanism or programming to return to designated starting area between repetitions.

The control unit may include "draw-to-drive" technology where a route can be drawn on the controller which is translated to real-world motion of the device. The processor of the control unit can record and repeat such routes that are created by the operator of the transmitter. In addition, the device may use previous player or team motion converted from video recording or motion tracking sensors placed on players.

The device 110 may have external lights or display 190 (FIG. 19) to provide users with information regarding internal assessment or feedback on player performance. Such information may include, but is not limited to, battery level or force of impact. Speakers 192 may also be incorporated to provide feedback or use audio to communicate or enhance reality of the training experience.

Device 110 may include an on-board processor 142 (FIG. 29). In addition, motion sensors 194 may be provided on the device to allow the device 110 to evade or attack approaching objects or tacklers. Alternatively or in combination, location or proximity detection devices may be provided and used to initiate un-programmed response motion of the device (e.g. evasive maneuvers). The sensor-locator system could be incorporated into player uniforms or helmets.

Device may incorporate cameras 196 (FIG. 19) for first person view and ease of driving and/or film review for training purposes.

In one illustrative embodiment, the device includes high density padding 114 around the base of the device and lower density padding 116 for the upper portion of the device. A structural element 198 (FIG. 21) may be provided for supporting the upper portion of padding. The structural element also provides a robust connection between the frame, the upper portion and the lower portion. The structural element 198 is a rigid but slightly flexible cylinder or post made from high density polyurethane. In other embodiments, other materials such as a metal beam or pipe may be used for the structural element. This material is highly durable, able to sustain a high force impact and is designed to restore itself to vertical after an impact. The structural element 198 may be bolted to the base of the device or fastened using other known fastening means. This structure is only necessary where the padding itself is not rigid enough to sustain contact and rotate the drive system during use.

The illustrative device 110 has high density foam 114 around the base 112 of the device 110 and lower density foam 116 for the upper portion of the device 110. Foams may be open-cell foams or closed-cell foams. Open-cell foams have gas pockets which are connected to one another, creating a lower density. In contrast, closed-cell foams have isolated gas pockets for a more rigid high-density shape. The high density, closed cell foam 114 around the base 112 is used as a cushion against and provide protection for the electronics. The high density, closed cell foam 114 also provides structure for the self-righting nature of the dummy or device 110. The low density, open-cell foam 116 is used where the primary impact area will be.

The design and composition of the upper portion of the mobile device may vary based upon desired training usage. For example, foam may be used for direct combat scenarios with implementation of arms, while a hardened/increased density exterior may be necessary when used in scenarios when field bullets or projectiles are involved. The upper portion may be in many shapes, including, but not limited to, the shape of a human or of a target. Incorporation of different configuration of the upper portion of the device allows the device to perform different functions, such as, but not limited to: act as a target for cut blocks; act as a target for passing (netting, basket, target or top circle attachment which falls or is knocked down when struck), or other receptacle to be used as a passing target; act as a blocker (for ball carriers and/or kickers and punters); act as a defender employing arms/hands that may be mobile and controlled actively or passively; act as a bullet proof target for military or law enforcement. Arm attachments 164 may employ different implementations including but not limited to jammer hands, D-line arms that can "shoot up" (i.e. arms start at rest or lowered position and upon activation or trigger, they will raise to an erect position in order to simulate a player raising their hands in front of or over their body to simulate a cornerback jamming wide-receiver or a D-line trying to throw hands up to block a quarterback's pass).

The upper portion 116 may be or include attachable members to allow for the interchangeability of different upper portions. Although the upper portion 116 may be detachable, the upper portion 116 is secured to the base 112 during normal operation, thereby preventing the unwanted detachment of the upper portion 116 from the base 112.

Figure 27:
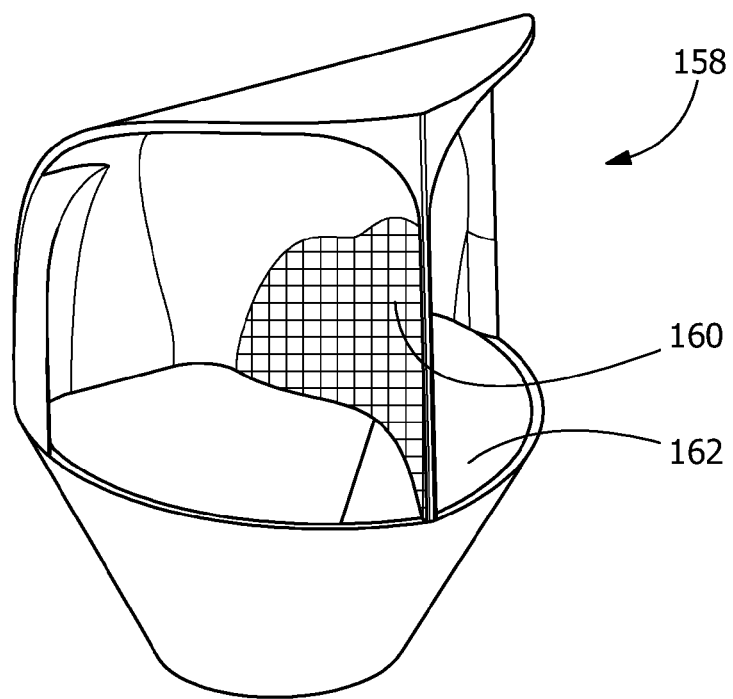
FIG. 27 is a perspective view on an illustrative attachment which can be used with the mobile device.
Figure 28:
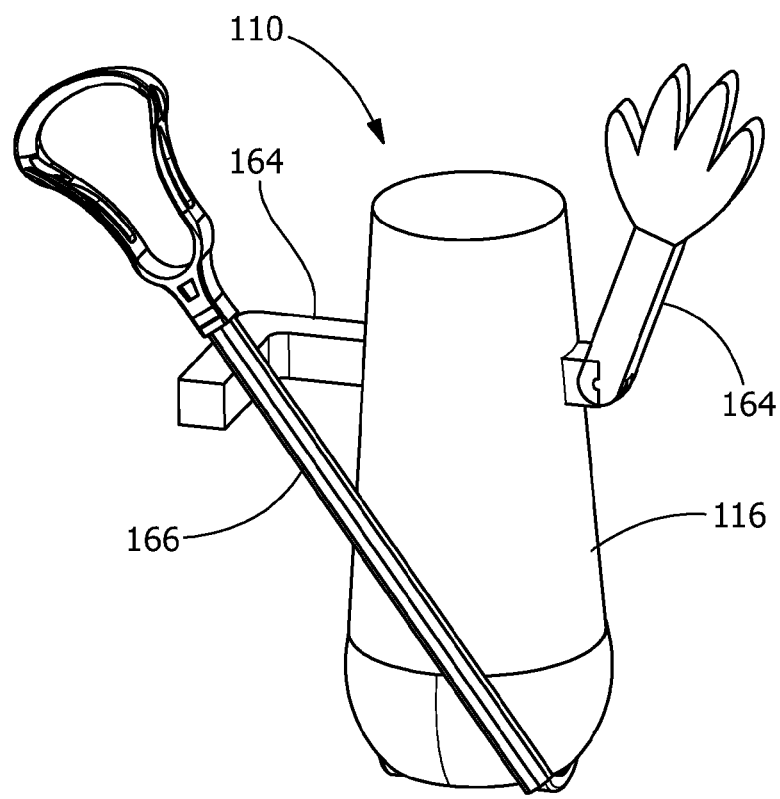
FIG. 28 is a perspective view on alternate illustrative attachments which can be used with the mobile device.

Accessories may be provided to expand the function of the device 110. Once example of an attachment is the ball catcher 158 shown in FIG. 27. The ball catcher 158 has a net 160 and a hopper 162 to facilitate the collection of balls or the like. Another example is shown in FIG. 28, which illustrates a device 110 with simulated arms 164 extending from the upper portion 116.

The device may include attachment points to act as holders for sticks 166 (lacrosse or hockey) as well as to be used as an anchoring/attachment point to transport other equipment. The attachments may be modular to serve multiple purposes on the field. The attachment points may also serve as a fixture for a ball, which may be facilitated by Velcro, magnetics, tether system or positioning of arms or other unique holding fixture, etc. Any moving components may utilize servo motors and corresponding RC channel controls and signals or may be controlled passively by a processor based on sensor inputs (for example the device may provide a stiff-arm when the device senses that a player is in close proximity. The upper portion may be configured to allow for draping of jerseys and other apparel.

Depending on the configuration of the upper portion 116 and the use of the device 110, the base may be made wider and more stable to act as blocker. The upper portion 116 can assume various configurations by adjusting the tilt and height. A tilt mode allows the upper portion to be mobile independent from the base. The height of the upper portion may be adjusted and set to different height dimensions. The height and tilt may also be self-adjusting in real time. For example, the upper portion 116 may lower its height to simulate a player crouching to absorb the hit. Furthermore, the upper portion 116 may also rotate independently of the base which may simulate a player spinning upon contact. In addition, different materials may be used for different surfaces/sports.

External passive designs may be included to encourage proper techniques and procedures. For example, a tackling zone may be marked to encourage proper tackling.

The device is configured to be water resistant and operate in all weather conditions. The device may be painted and/or the padding may be coated in vinyl-coated polyester or other durable coating to provide a robust, uniform and aesthetically pleasing finish.

The device is configured to be tall enough and heavy enough to provide a realistic visual target and realistic resistance for participants. In one embodiment, the device has a weight of approximately 180 lbs and a height of approximately 63 inches. Scaled versions of different size, weight, speed and acceleration may be used without departing the field of invention.

Alternate embodiments of the mobile device 110 include, but are not limited to a close-range combat device and a shooting target device. The close-range target device has self-stabilizing components as described above. In various embodiments, the close-range target device may include self-righting components as described above. Such a close-range target device may be used for example for training military or police or may be used as a sparring partner for boxing.

The shooting target device includes a drive system which has sufficient protection, such as a bullet proof casing, to protect the drive system from being harmed from live rounds of ammunition. A target area may be provided on the shooting target device. The target area may be made of bullet proof material or may be replaceable. Sensors may be provided to detect if the target area has been hit by the ammunition. Alternatively, or in addition, audio or visual feedback may be provided to communicate a hit.

The mobile device 110 and system simulates human motion as realistically as possible in order to practice various movements. In particular, the mobile device and system allows for practice of various movements, such as tackling, with no need for person-to-person contact. The drive permits for motion of the device in any direction, thereby allowing participants to practice in a simulated relevant scenario. The mobile device and system provide a safe alternative to live interaction and will increase participant safety and reduce the incidence of injuries during practice or drills while at the same time reinforcing proper form and procedures.

While the invention has been described with reference to an illustrative embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. As an example, the use of the mobile device on artificial surfaces may cause several of the components to be altered to prevent the rubber granules from interfering with the operation of the mobile device. The presently disclosed embodiments are therefore to be considered in all respects as illustrative and not restrictive.

The invention claimed is:

1. A remotely controlled mobile device comprising:
   a base including a self-propelled, remotely controlled, drive system, the drive system comprising at least two wheels, each wheel powered by at least one independent motor, where each wheel is coupled to an axle and having an axis of rotation defined thereby, the axes of rotation defining an axle plane;

an upper portion extending upwardly from, and attached to, the base, where the upper portion and the base have a longitudinal axis extending therethrough, where the axle plane is perpendicular to the longitudinal axis; and where the longitudinal axis is generally vertical when the device is in an upright position; and a suspension system having a contact element residing behind the two wheels, the contact element having a bottom, the contact element bottom defining a contact element bottom plane perpendicular to the longitudinal axis, the contact element bottom plane intersecting the longitudinal axis between an intersection of the axle plane with the longitudinal axis and an intersection with the longitudinal axis of a plane, perpendicular to the longitudinal axis, defined by a bottom of the at least two wheels; whereby the suspension system, via contact by the contact element with a ground surface, limits axial rotation of the upper portion about any of the axes of rotation during acceleration or deceleration of the device.

2. The device of claim 1, wherein the suspension system is a two part system, where a first part includes the contact element residing behind the two wheels, and a second part includes a contact element residing in front of the two wheels, the contact elements of the two part system each having a bottom, the bottoms defining the contact element bottom plane, perpendicular to the longitudinal axis, whereby the two part system, via contact by one or both of the contact elements with the ground surface, limits axial rotation of the upper portion about any of the axes of rotation during acceleration or deceleration of the device.

3. The device of claim 1, wherein the contact element comprises at least one slider, the at least one slider extending longitudinally, generally perpendicularly to a forward direction of the device, wherein a bottom of the at least one slider makes contact with the ground surface when the device tilts, relative to any of the axes of rotation, during acceleration or deceleration of the device.

4. The device of claim 3, wherein the at least one slider communicates with the base via one or more shafts mounted to the base, the one or more shafts disposed perpendicularly to the axle plane.

5. The device of claim 4, further comprising one or more springs provided on each of the one or more shafts, the one or more springs providing biased positioning of the one or more shafts relative to the base, and providing variable resistance to axial rotation of the upper portion about any of the axes of rotation upon slider contact with the ground surface.

6. The device of claim 1, wherein the contact element comprises at least one caster, each caster including a housing and a roller, where each housing is connected to the base and each roller rotates about an axis generally perpendicular to a forward direction of the device, whereby the roller makes contact with the ground surface when the device tilts, relative to any of the axes of rotation, during acceleration or deceleration of the device.

7. The device of claim 6, wherein each housing comprises a spring, the spring biasing the respective roller relative to the base and providing a variable dampening of an axial rotation of the upper portion about any of the axes of rotation when the respective roller makes contact with the ground surface when the device tilts, relative to any of the axes of rotation, during acceleration or deceleration of the device.

8. The device of claim 1, wherein the suspension system comprises components selected from the group consisting of hydraulic shocks, compression springs, inflatable air bladders, rollers on a vertical shaft, a swing arm design with resilient members, a flex arm design-steel leaf spring, a fiberglass rod and a torsion resistant fixed swing arm.

9. The device of claim 1, wherein the suspension system allows passive oscillation of the device, about any of the axes of rotation, during acceleration, deceleration and direction change of the device, and wherein the suspension system is modifiable to control an amount of passive oscillation by providing adjustability of a vertical or a horizontal distance between the bottom of the at least two wheels and the bottom of the contact element.

10. The device of claim 1, wherein the at least two wheels contact a ground surface to propel the device, the device being in an upright position when the at least two wheels are operationally contacting the ground surface;

the device further comprising a sensor and automatic control component, wherein control signals received remotely are disabled when the device is in an other than upright position.

11. The device of claim 10, wherein all power to the drive system is shutoff when the device is in the other than upright position.

12. The device of claim 10, wherein all power to the drive system is restricted upon an occurrence, within the device, selected from the group consisting of a low battery, a high temperature of one or more device components, human contact with the device, and device losing communication with the remote.

13. The device of claim 10, wherein the control signals received remotely are additionally disabled upon an occurrence, within the device, selected from the group consisting of a low battery, a high temperature of one or more device components, and human contact with the device.

14. The device of claim 10, wherein the remotely received control signals are pre-determined.

15. The device of claim 10, further comprising an external audiovisual display of status of the device selected from the group consisting of low battery, sensor status, a high temperature of one or more device components and device losing communication with the remote.

16. The device of claim 1, wherein the at least two wheels contact a ground surface to propel the device, the device being in an upright position when the at least two wheels are operationally contacting the ground surface;

the device further comprising one or more sensors and at least one processor or controller, wherein angular rotation information of the device is detected by the one or more sensors, with the at least one processor or controller determining and providing control instruction to the drive system based at least in part on the detected angular rotation information.

17. The device of claim 16, wherein:

one or more sensors detect angular rotation of the device; and the at least one processor or controller determines and provides control instruction for each of the at least two wheels independently based at least in part on the detected angular rotation of the device.

18. The device of claim 16, wherein the one or more sensors may each include a gyroscope, or accelerometer, or compass, to determine the angular rotation information detected.

19. The device of claim 16, wherein:
the one or more sensors each additionally include one or more components selected from the group consisting of a Global Positioning System, an Inertial Measurement Unit, positional reference markers, and a camera; and
the at least one processor or controller determines and provides control instruction to the drive system based at least in part on information provided by the one or more additionally included components.

20. A remotely controlled mobile device comprising: a base including a self-propelled, remotely controlled, drive system, at least a portion of the drive system contacting a ground surface to propel the device, the device being in an upright position when the at least a portion of the drive system is operationally contacting the ground surface; and an upper portion extending upwardly from, and attached to, the base, where the upper portion and the base have a longitudinal axis extending therethrough, the longitudinal axis being generally vertical when the device is in the upright position; wherein: the device is self-righting to an upright position when the device is in an other than upright position; the base has an at least partially rounded exterior enclosure that at least partially surrounds the drive system; the base, when in the other than upright position, has a point of the rounded exterior enclosure contacting the ground; the device has a center of mass within the base; and a location on the longitudinal axis where a plane defined through the center of mass and a perpendicular intersection with the longitudinal axis is below a location on the longitudinal axis where a plane defined through the point of the rounded exterior enclosure contacting the ground and extending vertically intersects the longitudinal axis.

21. The device of claim 20, wherein the drive system comprises at least two wheels, and wherein the device is in an upright position when the at least two wheels are operationally contacting the ground surface.

22. The device of claim 21, wherein:
the at least two wheels extend from a bottom of the exterior enclosure of the base;
the device is in an upright position when the at least two wheels are operationally contacting the ground surface and the exterior enclosure of the base is elevated above the ground surface, having no contact with the ground surface; and
the location on the longitudinal axis where the plane defined through the center of mass and the perpendicular intersection with the longitudinal axis causes the device to self-right, without the use of motors or electronic devices, to an upright position, with the exterior enclosure of the base elevated above the ground surface, wherein the exterior enclosure of the base has no contact with the ground surface.

23. The device of claim 20, wherein an entirety of the upper portion remains attached to the base when the device is in an upright position, when the device falls to an other than upright position, and when the device self-rights back to the upright position.

24. The device of claim 23, wherein the upper portion is secured to the base by a mounting component selected from the group consisting of a bracket, latch, vinyl covering, bolt, fastener, buckle and zipper.

25. The device of claim 20, wherein the device includes high density, closed cell foam in the base and low density, open cell foam in the upper portion, and wherein the low density, open cell foam in the upper portion is replaceable to provide differing upper portion shapes to enhance variability of device use.

26. The device of claim 20, further comprising a mobile mass or flywheel device to facilitate self-righting of the device to an upright position.

27. The device of claim 20, wherein the drive system comprises at least one tread, each tread powered by at least one independent motor, and wherein the device is in an upright position when the at least one tread is operationally contacting the ground surface.

28. The device of claim 20, further comprising pads on the device,
wherein the base is elliptical around a vertical axis which is perpendicular to an axis extending through wheels of the drive system, the elliptical base providing stability in a direction of motion while allowing the device to be self-righting;
whereby the device can be integrated into any activity where device motion can improve practice safety, efficiency and performance.

29. A mobile device which simulates human motion, the device comprising: a base having a drive system for providing motion to the device; pads provided on the device; and a suspension system both in front and behind an axis of rotation of the drive system, the suspension system having a contact element both in front and behind the axis of rotation of the drive system, that contacts a ground surface to resist axial rotation of a body of the device around the axis of rotation during rapid acceleration and deceleration, wherein the suspension system restores the device to a vertical position while dampening oscillation and maintaining sufficient normal force on the drive system to maintain traction; whereby the device can be integrated into any activity where device motion can improve practice safety, efficiency and performance.

* * * * *